United States Patent
Fukunaga

(10) Patent No.: US 9,885,409 B1
(45) Date of Patent: Feb. 6, 2018

(54) BICYCLE SPROCKET AND BICYCLE REAR SPROCKET ASSEMBLY

(71) Applicant: SHIMANO INC., Sakai (JP)

(72) Inventor: Yasufumi Fukunaga, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/263,263

(22) Filed: Sep. 12, 2016

(51) Int. Cl.
*F16H 55/12* (2006.01)
*F16H 55/30* (2006.01)
*B62M 9/10* (2006.01)
*F16H 57/00* (2012.01)

(52) U.S. Cl.
CPC .............. *F16H 55/30* (2013.01); *B62M 9/10* (2013.01); *F16H 57/0006* (2013.01)

(58) Field of Classification Search
CPC ......... B62M 9/10; B62M 9/105; F16H 55/30; F16H 55/08; F16G 13/06
USPC .......................................................... 474/160
See application file for complete search history.

(56) References Cited

U.S. PATENT DOCUMENTS

| | | | | |
|---|---|---|---|---|
| 4,181,033 A | * | 1/1980 | Nagano | B62M 9/10 474/156 |
| 4,268,259 A | * | 5/1981 | Segawa | B62M 9/10 474/160 |
| 4,596,539 A | * | 6/1986 | Yamasaki | B62M 9/10 474/206 |
| 4,889,521 A | * | 12/1989 | Nagano | B62M 9/10 474/164 |
| 5,085,620 A | | 2/1992 | Nagano | |
| 5,192,249 A | * | 3/1993 | Nagano | B62M 9/10 474/160 |
| 5,192,250 A | | 3/1993 | Kobayashi | |
| 5,299,925 A | * | 4/1994 | Chang | B62M 9/10 474/160 |
| 5,503,598 A | * | 4/1996 | Neuer | B62M 9/10 474/160 |
| 5,716,297 A | * | 2/1998 | Bodmer | B62M 9/10 474/160 |

(Continued)

FOREIGN PATENT DOCUMENTS

| | | |
|---|---|---|
| DE | 2758416 | 6/1978 |
| DE | 69016320 | 5/1995 |

(Continued)

*Primary Examiner* — Henry Y Liu
(74) *Attorney, Agent, or Firm* — Mori & Ward, LLP

(57) ABSTRACT

A bicycle sprocket comprises a sprocket body and a plurality of chain-driving teeth. The sprocket body includes a radially outer periphery and an axial center plane. The plurality of chain-driving teeth include at least one noise-reduction tooth. The at least one noise-reduction tooth comprises a downstream circumferential surface, an upstream circumferential surface, and a first axial surface. The first axial surface is provided between the downstream circumferential surface and the upstream circumferential surface to face in an axial direction parallel to a rotational center axis. The first axial surface includes an inclined surface inclined relative to an axial center plane so that an axial width of the at least one noise-reduction tooth decreases from one of the upstream circumferential surface and the downstream circumferential surface to the other of the upstream circumferential surface and the downstream circumferential surface.

18 Claims, 22 Drawing Sheets

(56) References Cited

U.S. PATENT DOCUMENTS

| | | | | |
|---|---|---|---|---|
| 5,738,603 | A * | 4/1998 | Schmidt | B62M 9/10 474/158 |
| 5,782,712 | A * | 7/1998 | Campagnolo | B62M 9/00 474/152 |
| 5,876,159 | A * | 3/1999 | Tseng | B23F 19/10 409/131 |
| 5,876,296 | A * | 3/1999 | Hsu | B62M 9/10 474/140 |
| 5,921,878 | A * | 7/1999 | Young | F16G 13/06 474/156 |
| 5,976,045 | A * | 11/1999 | Young | F16H 7/06 474/152 |
| 5,993,344 | A * | 11/1999 | Young | F16G 13/06 474/156 |
| 6,045,472 | A * | 4/2000 | Sung | B62M 9/10 474/158 |
| 6,139,456 | A * | 10/2000 | Lii | B62M 9/10 474/152 |
| 6,340,338 | B1 * | 1/2002 | Kamada | B62M 9/122 474/152 |
| 6,371,875 | B2 * | 4/2002 | Young | F16H 7/06 474/156 |
| 6,666,786 | B2 * | 12/2003 | Yahata | B62M 9/105 474/152 |
| 6,923,741 | B2 * | 8/2005 | Wei | B62M 9/10 474/152 |
| 7,491,143 | B2 * | 2/2009 | Valle | B62M 9/105 474/152 |
| 8,092,329 | B2 * | 1/2012 | Wickliffe | B62M 9/105 474/160 |
| 8,096,908 | B2 * | 1/2012 | Oishi | B62M 9/10 474/160 |
| 8,226,511 | B2 * | 7/2012 | Kamada | B62M 9/10 474/152 |
| 8,506,436 | B2 * | 8/2013 | Wickiffe | B62M 9/105 474/160 |
| 8,517,874 | B2 * | 8/2013 | Reiter | B62M 9/10 474/152 |
| 8,617,015 | B2 * | 12/2013 | Wickliffe | F16H 55/30 474/140 |
| 8,882,619 | B2 * | 11/2014 | Braedt | F16H 7/06 474/156 |
| 9,297,450 | B2 * | 3/2016 | Numata | F16H 55/08 |
| 9,463,844 | B2 * | 10/2016 | Fukunaga | B62M 9/10 |
| 9,528,588 | B2 * | 12/2016 | Reiter | B62M 9/10 |
| 9,677,658 | B2 * | 6/2017 | Wickliffe | F16H 55/30 |
| 9,701,364 | B2 * | 7/2017 | Sugimoto | B62M 9/10 |
| 2002/0086753 | A1 * | 7/2002 | Yahata | B62M 9/105 474/160 |
| 2003/0186766 | A1 * | 10/2003 | Wang | F16H 55/30 474/152 |
| 2004/0043855 | A1 * | 3/2004 | Wei | B62M 9/10 474/160 |
| 2004/0142782 | A1 * | 7/2004 | Kamada | B60B 27/026 474/160 |
| 2005/0079940 | A1 * | 4/2005 | Reiter | B62M 9/10 474/160 |
| 2005/0119079 | A1 * | 6/2005 | Okabe | F16G 13/06 474/155 |
| 2006/0240925 | A1 * | 10/2006 | Todd | F16H 55/30 474/156 |
| 2007/0049437 | A1 * | 3/2007 | Wickliffe | F16H 55/30 474/152 |
| 2007/0054768 | A1 | 3/2007 | Miyazawa | |
| 2008/0020880 | A1 * | 1/2008 | Valle | B62M 9/105 474/160 |
| 2010/0004081 | A1 | 1/2010 | Braedt | |
| 2012/0202633 | A1 * | 8/2012 | Wickliffe | B62M 9/105 474/160 |
| 2013/0139642 | A1 | 6/2013 | Reiter et al. | |
| 2013/0316863 | A1 * | 11/2013 | Reiter | B62M 9/10 474/160 |
| 2014/0113757 | A1 * | 4/2014 | Wickliffe | F16H 55/30 474/160 |
| 2014/0179474 | A1 * | 6/2014 | Florczyk | B62M 9/10 474/160 |
| 2016/0059931 | A1 * | 3/2016 | Fukunaga | B62M 9/10 474/158 |

FOREIGN PATENT DOCUMENTS

| | | |
|---|---|---|
| DE | 69205719 | 5/1996 |
| EP | 0047927 | 3/1982 |
| JP | 62-23187 U | 2/1987 |
| JP | 62-65387 U | 4/1987 |

* cited by examiner (COMPARATIVE EXAMPLE) FIG. 20

BICYCLE SPROCKET AND BICYCLE REAR SPROCKET ASSEMBLY

BACKGROUND OF THE INVENTION

Field of the Invention

The present invention relates to a bicycle sprocket and a bicycle rear sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle sprocket comprises a sprocket body and a plurality of chain-driving teeth. The sprocket body includes a radially outer periphery and an axial center plane. The radially outer periphery is provided about a rotational center axis of the bicycle sprocket. The axial center plane is perpendicular to the rotational center axis. The plurality of chain-driving teeth are provided on the radially outer periphery to engage with a bicycle chain. The plurality of chain-driving teeth include at least one noise-reduction tooth. The at least one noise-reduction tooth comprises a downstream circumferential surface, an upstream circumferential surface, and a first axial surface. The downstream circumferential surface faces in a driving rotational direction in which the bicycle sprocket is rotated about the rotational center axis during pedaling. The upstream circumferential surface faces in a reversing rotational direction opposite to the driving rotational direction. The first axial surface is provided between the downstream circumferential surface and the upstream circumferential surface to face in an axial direction parallel to the rotational center axis. The first axial surface includes an inclined surface inclined relative to the axial center plane so that an axial width of the at least one noise-reduction tooth decreases from one of the upstream circumferential surface and the downstream circumferential surface to the other of the upstream circumferential surface and the downstream circumferential surface.

With the bicycle sprocket according to the first aspect, it is possible to reduce noise caused by contact between the plurality of chain-driving teeth and the bicycle chain even if the bicycle chain is inclined relative to the bicycle sprocket when viewed from a radial direction perpendicular to the rotational center axis.

In accordance with a second aspect of the present invention, the bicycle sprocket according to the first aspect is configured so that the at least one noise reduction tooth has a chain engaging portion engageable with the bicycle chain. The inclined surface is provided in the chain engaging portion.

With the bicycle sprocket according to the second aspect, it is possible to effectively reduce noise caused by contact between the plurality of chain-driving teeth and the bicycle chain even if the bicycle chain is inclined relative to the bicycle sprocket when viewed from the radial direction.

In accordance with a third aspect of the present invention, the bicycle sprocket according to the first or second aspect is configured so that the at least one noise-reduction tooth comprises a second axial surface provided between the downstream circumferential surface and the upstream circumferential surface to face in the axial direction. The second axial surface is opposite to the first axial surface in the axial direction. The axial width of the at least one noise-reduction tooth is defined between the inclined surface of the first axial surface and the second axial surface in the axial direction.

With the bicycle sprocket according to the third aspect, it is possible to reduce noise caused by contact between the plurality of chain-driving teeth and the bicycle chain even if the bicycle chain is inclined relative to the bicycle sprocket when viewed from the radial direction.

In accordance with a fourth aspect of the present invention, the bicycle sprocket according to the third aspect further comprises a plurality of tooth bottoms respectively provided between adjacent two teeth of the plurality of chain-driving teeth in the driving rotational direction. Each of the plurality of tooth bottoms includes a bottom axial width defined in the axial direction. A downstream axial width is defined as the axial width at a position closest to the downstream circumferential surface in the inclined surface and is defined between the inclined surface of the first axial surface and the second axial surface in the axial direction. The downstream axial width is smaller than the bottom axial width.

With the bicycle sprocket according to the fourth aspect, it is possible to effectively reduce noise caused by contact between the plurality of chain-driving teeth and the bicycle chain even if the bicycle chain is inclined relative to the bicycle sprocket when viewed from the radial direction.

In accordance with a fifth aspect of the present invention, the bicycle sprocket according to any one of the first to fifth aspects further comprises a plurality of tooth bottoms respectively provided between adjacent two teeth of the plurality of chain-driving teeth in the driving rotational direction. The plurality of tooth bottoms define a root circle. The at least one noise-reduction tooth comprises a radially outermost end farther from the root circle than the inclined surface when viewed from the axial direction.

With the bicycle sprocket according to the fifth aspect, it is possible to reduce noise caused by contact between the plurality of chain-driving teeth and the bicycle chain with maintaining strength of the bicycle sprocket.

In accordance with a sixth aspect of the present invention, the bicycle sprocket according to the fifth aspect is configured so that the root circle is closer to the inclined surface than the radially outermost end.

With the bicycle sprocket according to the sixth aspect, it is possible to reduce noise caused by contact between the plurality of chain-driving teeth and the bicycle chain with maintaining strength of the bicycle sprocket.

In accordance with a seventh aspect of the present invention, the bicycle sprocket according to any one of the first to sixth aspects is configured so that the inclined surface has a maximum circumferential length and a maximum radial length. The maximum circumferential length is defined in the driving rotational direction. The maximum radial length is defined in a radial direction perpendicular to the rotational center axis. The maximum circumferential length is longer than the maximum radial length.

With the bicycle sprocket according to the seventh aspect, it is possible to reduce noise caused by contact between the plurality of chain-driving teeth and the bicycle chain with maintaining chain-holding performance of the bicycle sprocket.

In accordance with an eighth aspect of the present invention, the bicycle sprocket according to any one of the first to seventh aspects is configured so that the inclined surface is continuously coupled to the downstream circumferential surface.

With the bicycle sprocket according to the eighth aspect, it is possible to effectively reduce noise caused by contact between the plurality of chain-driving teeth and the bicycle chain even if the bicycle chain is inclined relative to the bicycle sprocket when viewed from the radial direction.

In accordance with a ninth aspect of the present invention, the bicycle sprocket according to any one of the first to eighth aspects is configured so that the first axial surface includes an intermediate surface provided between the inclined surface and the upstream circumferential surface. The intermediate surface extends along the axial center plane to make the axial width constant between the inclined surface and the upstream circumferential surface.

With the bicycle sprocket according to the ninth aspect, it is possible to reduce noise caused by contact between the plurality of chain-driving teeth and the bicycle chain with maintaining chain-holding performance of the bicycle sprocket.

In accordance with a tenth aspect of the present invention, the bicycle sprocket according to any one of the first to ninth aspects further comprises a hub engagement part coupled to the sprocket body to engage with a bicycle hub assembly.

With the bicycle sprocket according to the tenth aspect, it is possible to provide a rear sprocket that can reduce noise caused by contact between the plurality of chain-driving teeth and the bicycle chain even if the bicycle chain is inclined relative to the bicycle sprocket when viewed from the radial direction.

In accordance with an eleventh aspect of the present invention, the bicycle sprocket according to any one of the first to tenth aspects is configured so that the inclined surface is inclined relative to the axial center plane so that the axial width of the at least one noise-reduction tooth decreases from the upstream circumferential surface to the downstream circumferential surface.

With the bicycle sprocket according to the eleventh aspect, it is possible to effectively reduce noise caused by contact between the plurality of chain-driving teeth and the bicycle chain even if the bicycle chain is inclined relative to the bicycle sprocket when viewed from the radial direction.

In accordance with a twelfth aspect of the present invention, a bicycle rear sprocket assembly comprises at least three bicycle sprockets according to the eleventh aspect and at least six additional bicycle sprockets. The at least three bicycle sprockets are positioned closer to an axial hub-center plane of a bicycle rear hub assembly than the at least six additional bicycle sprockets in a state where the bicycle rear sprocket assembly is mounted to the bicycle rear hub assembly.

With the bicycle rear sprocket assembly according to the twelfth aspect, it is possible to provide a rear sprocket assembly that can reduce noise caused by contact between the plurality of chain-driving teeth and the bicycle chain even if the bicycle chain is inclined relative to the bicycle sprocket when viewed from the radial direction.

In accordance with a thirteenth aspect of the present invention, the bicycle rear sprocket assembly according to the twelfth aspect is configured so that the at least three bicycle sprockets includes a first bicycle sprocket, a second bicycle sprocket, and a third bicycle sprocket. The first bicycle sprocket has a first diameter defined by the plurality of chain-driving teeth of the first bicycle sprocket. The second bicycle sprocket has a second diameter defined by the plurality of chain-driving teeth of the second bicycle sprocket. The third bicycle sprocket has a third diameter defined by the plurality of chain-driving teeth of the third bicycle sprocket. The first diameter is larger than the second diameter. The second diameter is larger than the third diameter.

With the bicycle rear sprocket assembly according to the thirteenth aspect, it is possible to provide a rear sprocket assembly that can reduce noise caused by contact between the plurality of chain-driving teeth and the bicycle chain even if the bicycle chain is inclined relative to the bicycle sprocket when viewed from the radial direction.

In accordance with a fourteenth aspect of the present invention, the bicycle rear sprocket assembly according to the thirteenth aspect is configured so that the inclined surface of the first bicycle sprocket has a first inclined angle with respect to a first axial center plane perpendicular to the rotational center axis. The inclined surface of the second bicycle sprocket has a second inclined angle with respect to a second axial center plane perpendicular to the rotational center axis. The inclined surface of the third bicycle sprocket has a third inclined angle with respect to a third axial center plane perpendicular to the rotational center axis. The first inclined angle is larger than the second inclined angle. The second inclined angle is larger than the third inclined angle.

With the bicycle rear sprocket assembly according to the fourteenth aspect, it is possible to provide a rear sprocket assembly that can effectively reduce noise caused by contact between the plurality of chain-driving teeth and the bicycle chain even if the bicycle chain is inclined relative to the bicycle sprocket when viewed from the radial direction.

In accordance with a fifteenth aspect of the present invention, a bicycle sprocket comprises a sprocket body and a plurality of chain-driving teeth. The sprocket body includes a radially outer periphery, a first side surface, and a second side surface. The radially outer periphery is provided about a rotational center axis of the bicycle sprocket. The first side surface faces in an axial direction parallel to the rotational center axis. The second side surface faces in the axial direction and is provided on a reverse side of the first side surface in the axial direction. The plurality of chain-driving teeth are provided on the radially outer periphery to engage with a bicycle chain. The plurality of chain-driving teeth include at least one noise-reduction tooth. The at least one noise-reduction tooth comprises a downstream circumferential surface, an upstream circumferential surface, and a first axial surface. The downstream circumferential surface faces in a driving rotational direction in which the bicycle sprocket is rotated about the rotational center axis during pedaling. The upstream circumferential surface faces in a reversing rotational direction opposite to the driving rotational direction. The first axial surface is provided between the downstream circumferential surface and the upstream circumferential surface to face in the axial direction. The first side surface is closer to the first axial surface than the second side surface in the axial direction. The first axial surface includes an inclined surface inclined relative to the second side surface so that an axial distance defined between the second side surface and the inclined surface in the axial direction decreases from one of the upstream circumferential surface and the downstream circumferential surface to the other of the upstream circumferential surface and the downstream circumferential surface.

With the bicycle sprocket according to the fifteenth aspect, it is possible to reduce noise caused by contact between the plurality of chain-driving teeth and the bicycle chain even if the bicycle chain is inclined relative to the bicycle sprocket when viewed from a radial direction perpendicular to the rotational center axis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
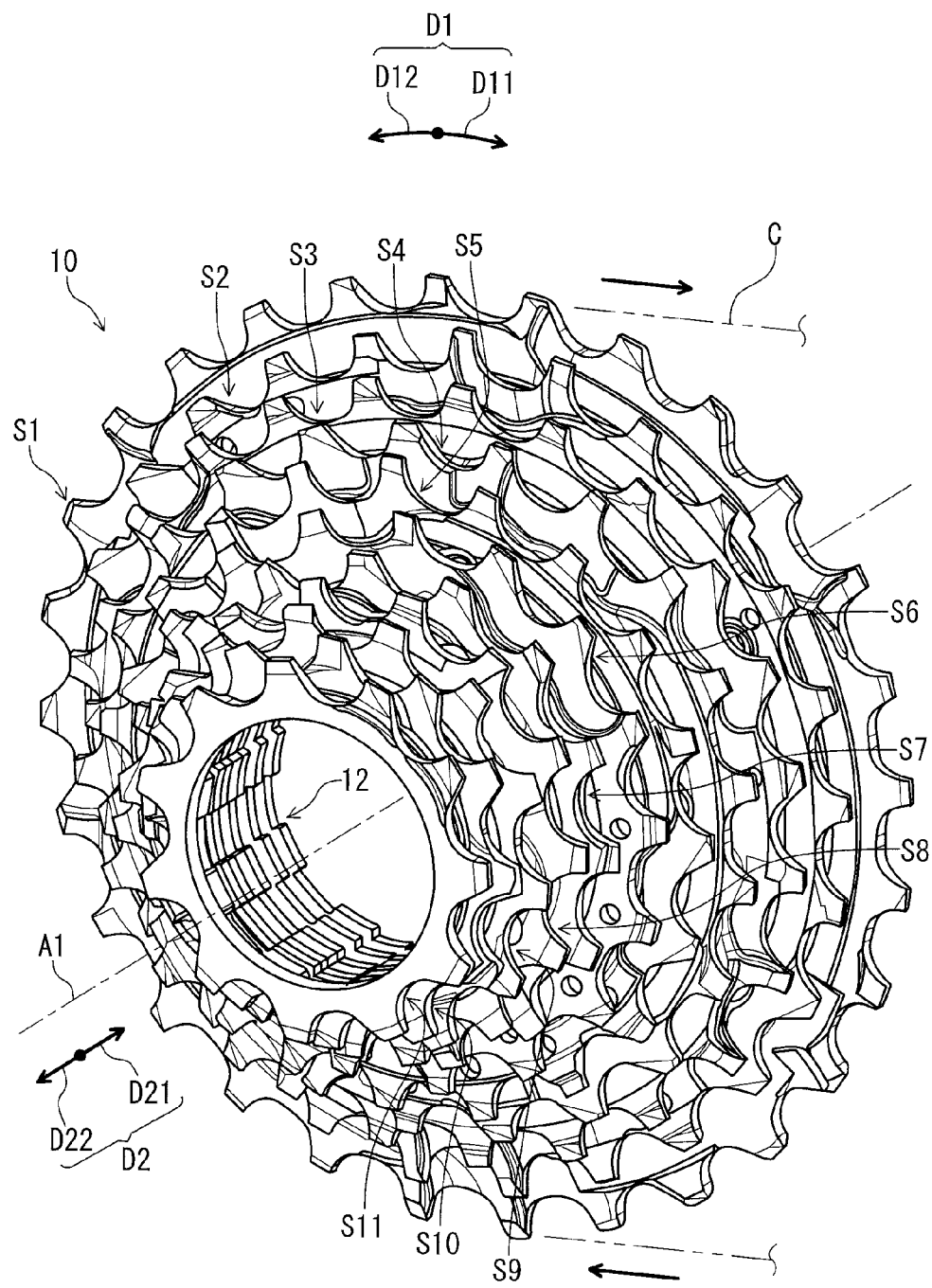
FIG. 1 is a perspective view of a bicycle rear sprocket assembly in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle rear sprocket assembly 10 including a bicycle sprocket in accordance with a first embodiment is illustrated. The bicycle rear sprocket assembly 10 is configured to engage with a bicycle chain C. The bicycle rear sprocket assembly 10 comprises at least three bicycle sprockets and at least six additional bicycle sprockets. In this embodiment, the bicycle rear sprocket assembly 10 comprises three bicycle sprockets S1 to S3 and eight additional bicycle sprockets S4 to S11. The bicycle rear sprocket assembly 10 has a rotational center axis A1. The bicycle rear sprocket assembly 10 is rotatable about the rotational center axis A1 in a driving rotational direction D11 during the pedaling. The driving rotational direction D11 is defined along a circumferential direction D1 of the bicycle rear sprocket assembly 10. A reversing rotational direction D12 is a reverse direction of the driving rotational direction D11 and is defined along the circumferential direction D1.

Figure 2:
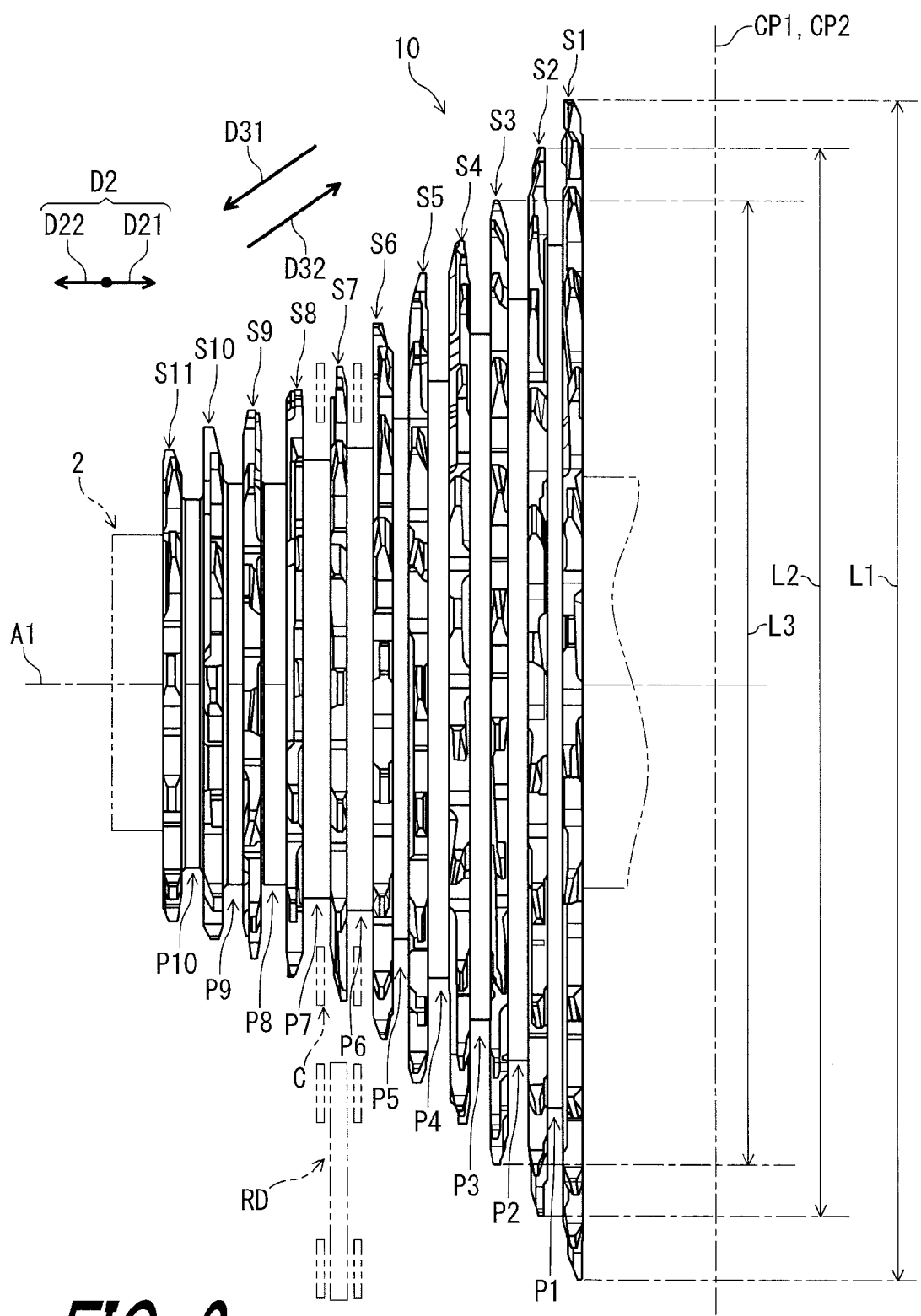
FIG. 2 is a front elevational view of the bicycle rear sprocket assembly.

As seen in FIG. 1, the bicycle rear sprocket assembly 10 further comprises a hub engagement structure 12 configured to engage with a bicycle hub assembly 2 (FIG. 2). The bicycle hub assembly 2 can also be referred to as a bicycle rear hub assembly 2. The structures of the bicycle rear sprocket assembly 10 can be applied to a front sprocket assembly if needed and/or desired.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle rear sprocket assembly 10 or the bicycle sprockets S1 to S11, should be interpreted relative to the bicycle equipped with the bicycle rear sprocket assembly 10 or the bicycle sprockets S1 to S11 as used in an upright riding position on a horizontal surface.

As seen in FIG. 2, the bicycle sprockets S1 to S11 are arranged in an axial direction D2 parallel to the rotational center axis A1. The bicycle sprockets S1 to S11 are spaced apart from each other in the axial direction D2. The bicycle rear sprocket assembly 10 includes spacers P1 to P10. Each of the spacers P1 to P10 is arranged between adjacent two sprockets of the bicycle sprockets S1 to S11. Instead of such spacers, a sprocket support member to which a plurality of bicycle sprockets are mounted can also be used.

The bicycle sprocket S1 is closer to a bicycle center plane CP1 of a bicycle frame (not shown) than the bicycle sprocket S11 in a state where the bicycle rear sprocket assembly 10 is mounted to the bicycle rear hub assembly 2. In the bicycle rear sprocket assembly 10, for example, upshifting occurs when the bicycle chain C is shifted by a rear derailleur RD from a larger sprocket to a neighboring smaller sprocket in an upshifting direction D31. Downshifting occurs when the bicycle chain C is shifted by the rear derailleur RD from a small sprocket to a neighboring larger sprocket in a downshifting direction D32.

The at least three bicycle sprockets are positioned closer to an axial hub-center plane CP2 of the bicycle rear hub assembly 2 than the at least six additional bicycle sprockets in a state where the bicycle rear sprocket assembly 10 is mounted to the bicycle rear hub assembly 2. In this embodiment, the bicycle sprockets S1 to S3 are positioned closer to the axial hub-center plane CP2 of the bicycle rear hub assembly 2 than the additional bicycle sprockets S4 to S11 in the state where the bicycle rear sprocket assembly 10 is mounted to the bicycle rear hub assembly 2. The axial hub-center plane CP2 of the bicycle rear hub assembly 2 is defined at substantially the same position as the position of the bicycle center plane CP1 of the bicycle frame (not shown).

The bicycle sprockets S4 to S11 have substantially the same structures as those of the bicycle sprockets S1 to S3 except for at least one noise-reduction tooth. Thus, the bicycle sprockets S1 to S3 will be described in detail below, and other bicycle sprockets S4 to S11 will not be described in detail here for the sake of brevity. In this embodiment, the bicycle sprocket S1 can also be referred to as a first bicycle sprocket S1. The bicycle sprocket S2 can also be referred to as a second bicycle sprocket S2. The bicycle sprocket S3 can also be referred to as a third bicycle sprocket S3. Namely, the at least three bicycle sprockets include the first bicycle sprocket S1, the second bicycle sprocket S2, and the third bicycle sprocket S3.

As seen in FIG. 2, the first bicycle sprocket S1 is adjacent to the second bicycle sprocket S2 in the axial direction D2 parallel to the rotational center axis A1 without another sprocket between the first bicycle sprocket S1 and the second bicycle sprocket S2. The second bicycle sprocket S2 is adjacent to the third bicycle sprocket S3 in the axial direction D2 without another sprocket between the second bicycle sprocket S2 and the third bicycle sprocket S3. The second bicycle sprocket S2 is provided between the first bicycle sprocket S1 and the third bicycle sprocket S3 in the axial direction D2.

Figure 3:
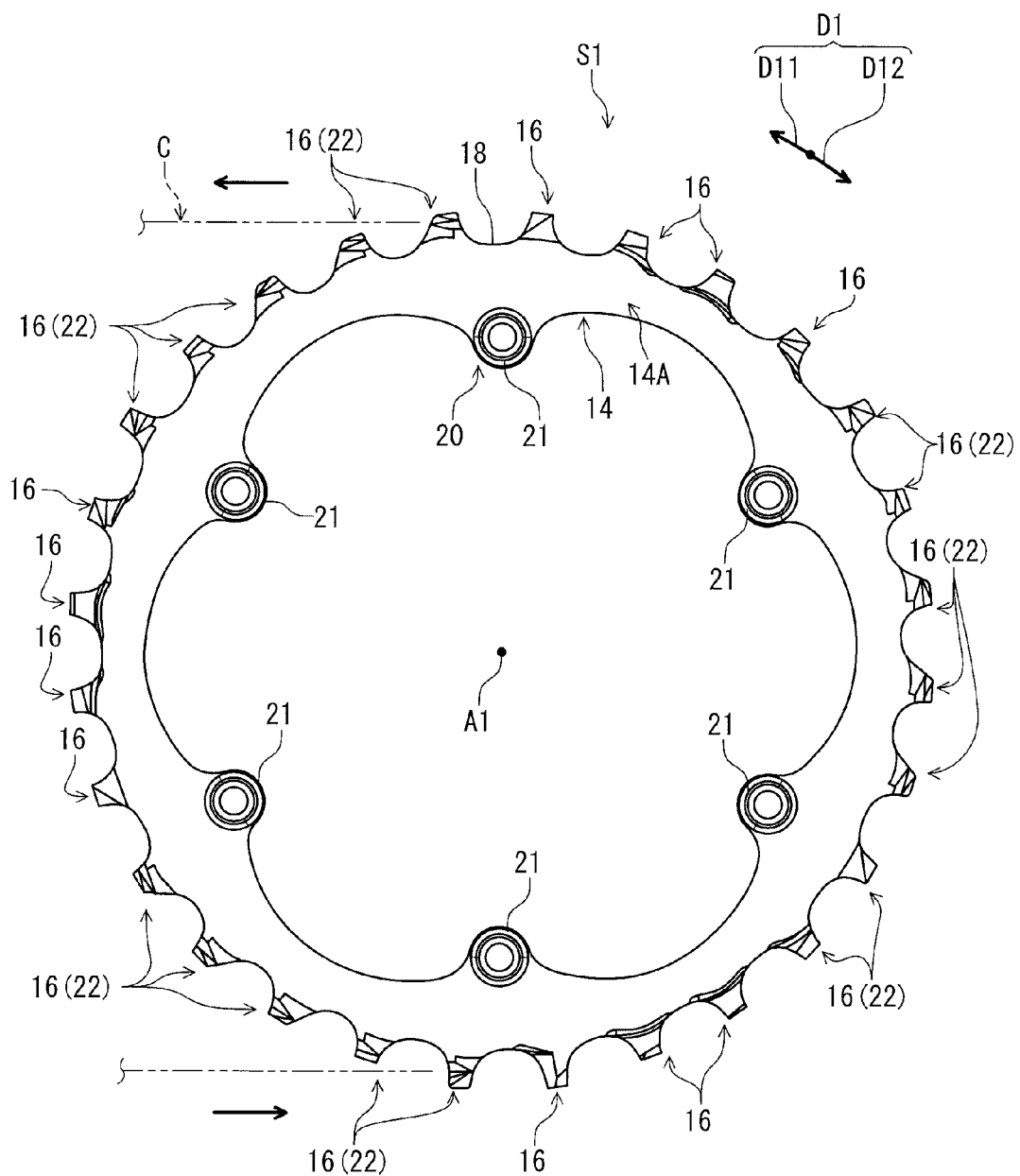
FIG. 3 is a side elevational view of a first sprocket of the bicycle rear sprocket assembly.
Figure 4:
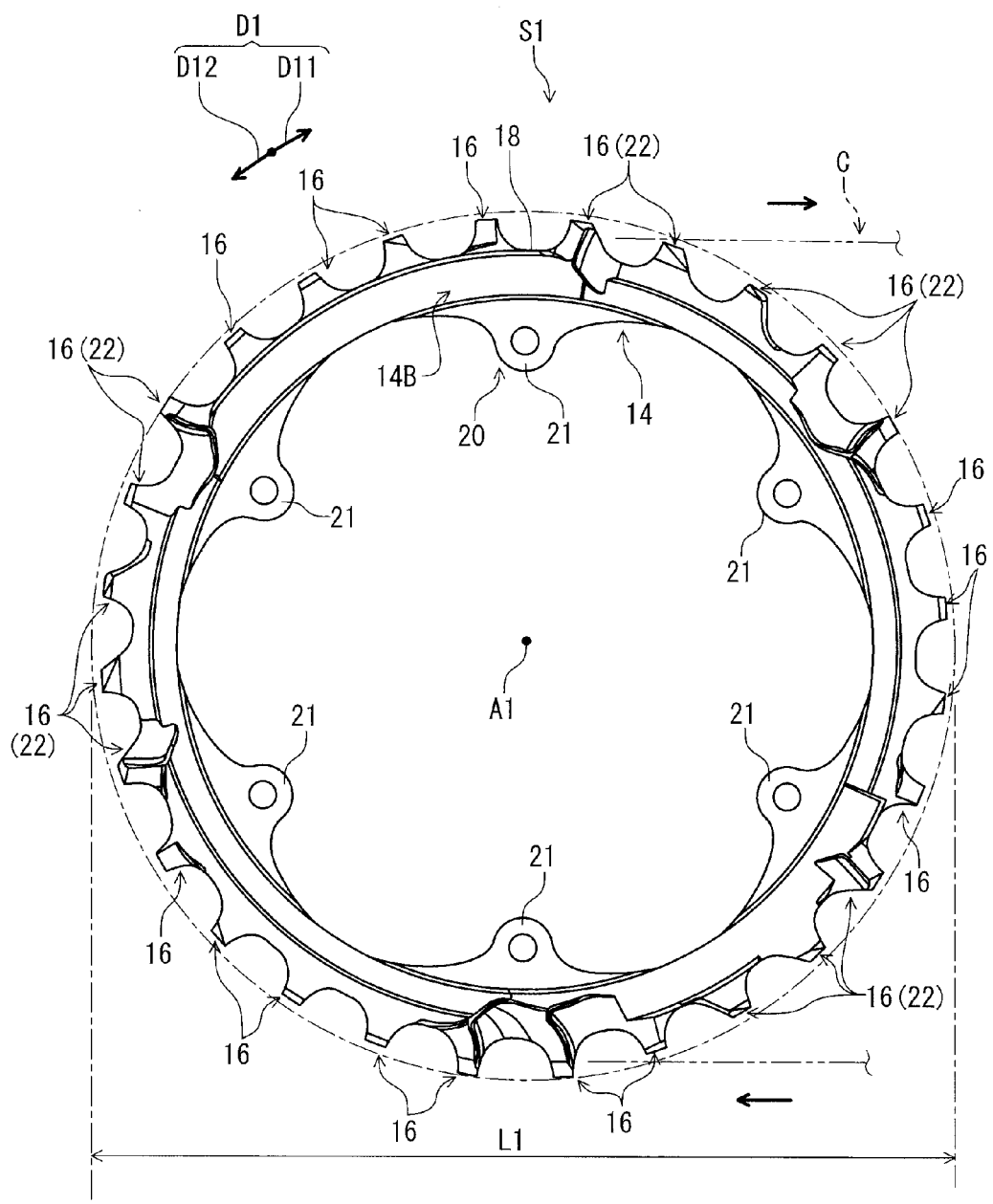
FIG. 4 is another side elevational view of the first sprocket.

As seen in FIGS. 3 and 4, the bicycle sprocket S1 comprises a sprocket body 14 and a plurality of chain-driving teeth 16. The sprocket body 14 includes a radially outer periphery 18 provided about the rotational center axis A1 of the bicycle sprocket S1. The plurality of chain-driving teeth 16 are provided on the radially outer periphery 18 to engage with the bicycle chain C. The sprocket body 14 is configured to be rotatable about the rotational center axis A1. The sprocket body 14 has an annular shape. The plurality of chain-driving teeth 16 extend radially outward from the radially outer periphery 18 of the sprocket body 14. As seen in FIG. 4, the first bicycle sprocket S1 has a first diameter L1 defined by the plurality of chain-driving teeth 16 of the first bicycle sprocket S1. In this embodiment, the first diameter L1 is defined as a maximum outer diameter of the first bicycle sprocket S1. A total number of the plurality of chain-driving teeth 16 is twenty-eight. However, the total number of the plurality of chain-driving teeth 16 is not limited to this embodiment.

As seen in FIGS. 3 and 4, the bicycle sprocket S1 further comprises a hub engagement part 20 coupled to the sprocket body 14 to engage with the bicycle hub assembly 2. The hub engagement part 20 includes securing portions 21 extending radially inward from an inner periphery of the sprocket body 14. The securing portions 21 are spaced apart from each other in the circumferential direction D1. The first bicycle sprocket S1 is secured to a sprocket support member (not shown) via the securing portions 21.

The plurality of chain-driving teeth 16 include at least one noise-reduction tooth 22. In this embodiment, the plurality of chain-driving teeth 16 include a plurality of noise-reduction teeth 22. However, a total number of the noise-reduction teeth 22 is not limited to this embodiment.

Figure 5:
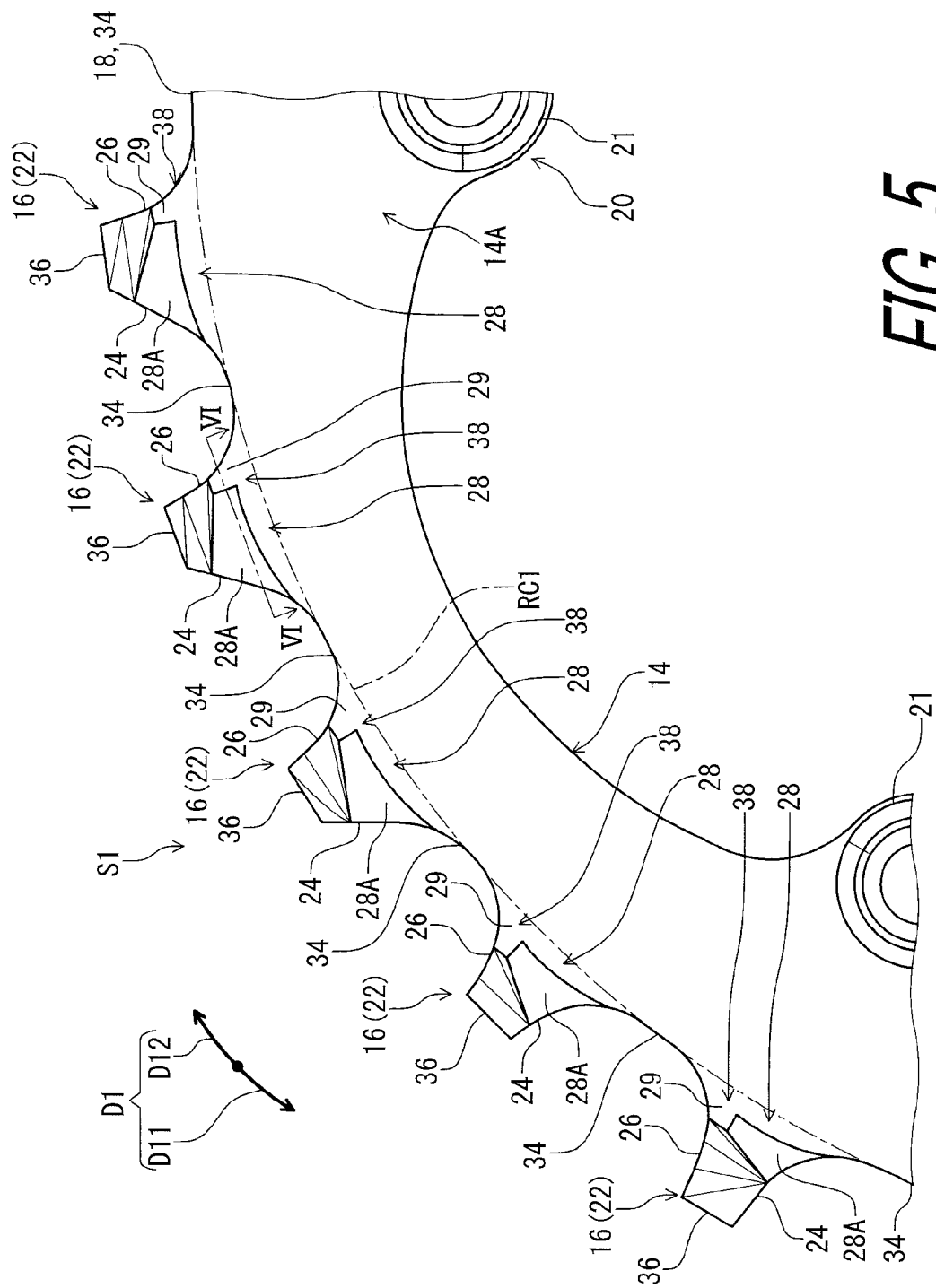
FIG. 5 is a partial side elevational view of the first sprocket.

As seen in FIG. 5, the at least one noise-reduction tooth 22 comprises a downstream circumferential surface 24 and an upstream circumferential surface 26. The downstream circumferential surface 24 faces in the driving rotational direction D11 in which the bicycle sprocket S1 is rotated about the rotational center axis A1 during pedaling. The upstream circumferential surface 26 faces in the reversing rotational direction D12 opposite to the driving rotational direction D11. In the noise-reduction tooth 22, the downstream circumferential surface 24 is provided on a reverse side of the upstream circumferential surface 26 in the circumferential direction D1. The upstream circumferential surface 26 is contactable with a roller C2 (FIG. 6) of the bicycle chain C during pedaling to receive a pedaling force from the bicycle chain C.

Figure 6:
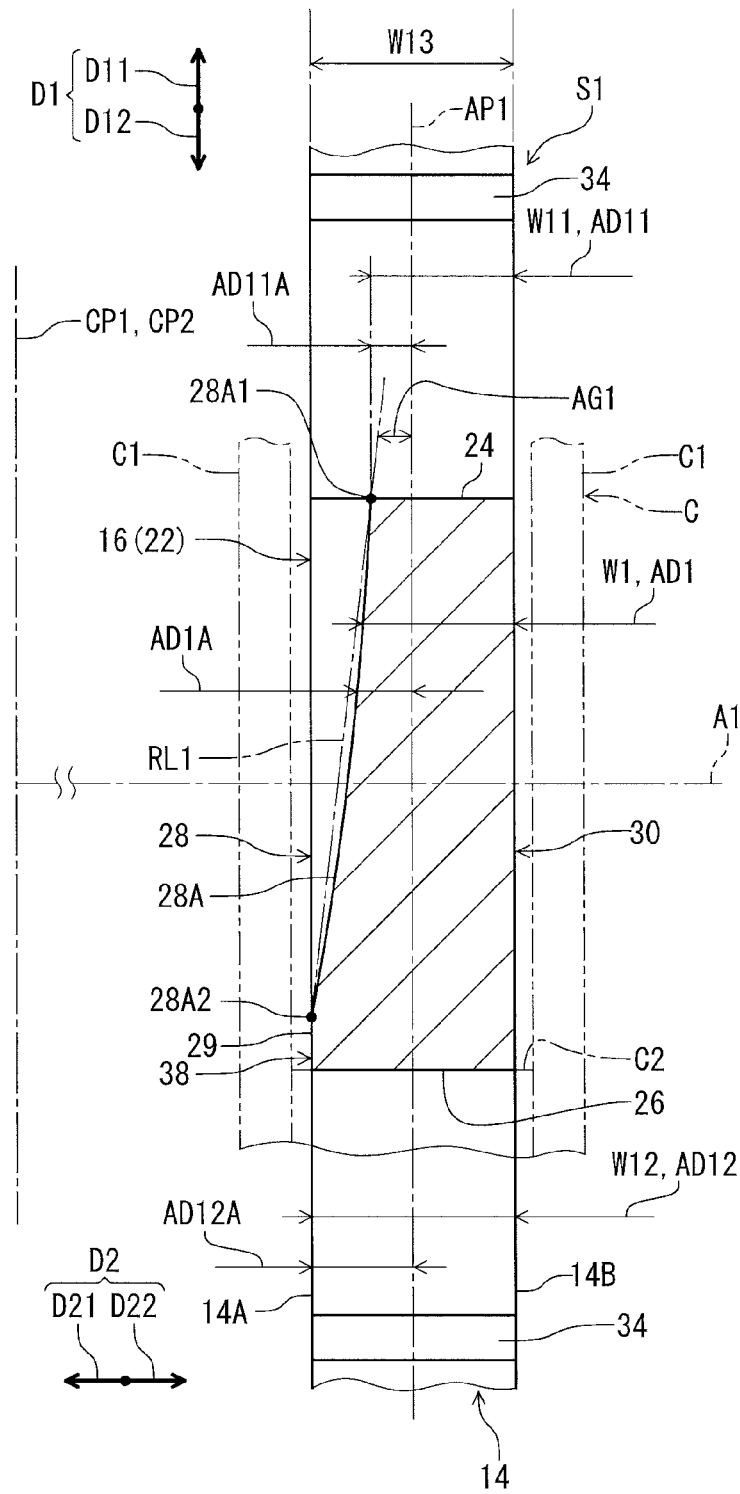
FIG. 6 is a cross-sectional view of the first sprocket taken along with line VI-VI of FIG. 5.

As seen in FIG. 6, the at least one noise-reduction tooth 22 comprises a first axial surface 28 provided between the downstream circumferential surface 24 and the upstream circumferential surface 26 to face in the axial direction D2 parallel to the rotational center axis A1. The sprocket body 14 includes an axial center plane AP1 perpendicular to the rotational center axis A1. The axial center plane AP1 can also be referred to as a first axial center plane AP1. In this embodiment, the sprocket body 14 includes a first side surface 14A and a second side surface 14B. The first side surface 14A faces in the axial direction D2 parallel to the rotational center axis A1. The second side surface 14B faces in the axial direction D2 and provided on a reverse side of the first side surface 14A in the axial direction D2. The first side surface 14A is closer to the first axial surface 28 than the second side surface 14B in the axial direction D2.

The first side surface 14A and the first axial surface 28 face in a first axial direction D21 defined along the axial direction D2. The second side surface 14B faces in a second axial direction D22 defined along the axial direction D2. The second axial direction D22 is a reverse direction of the first axial direction D21. The axial center plane AP1 is defined at an axial center between the first side surface 14A and the second side surface 14B in the axial direction D2.

In this embodiment, the first axial surface 28 faces toward the axial hub-center plane CP2 of the bicycle hub assembly 2 in the axial direction D2 in the state where the bicycle sprocket S1 is mounted to the bicycle hub assembly 2 (FIG. 2). However, the first axial surface 28 can be disposed to face toward an opposite side of the bicycle center plane CP1 relative to the bicycle sprocket S1 in the axial direction D2 in the state where the bicycle sprocket S1 is mounted to the bicycle hub assembly 2 (FIG. 2).

Figure 7:
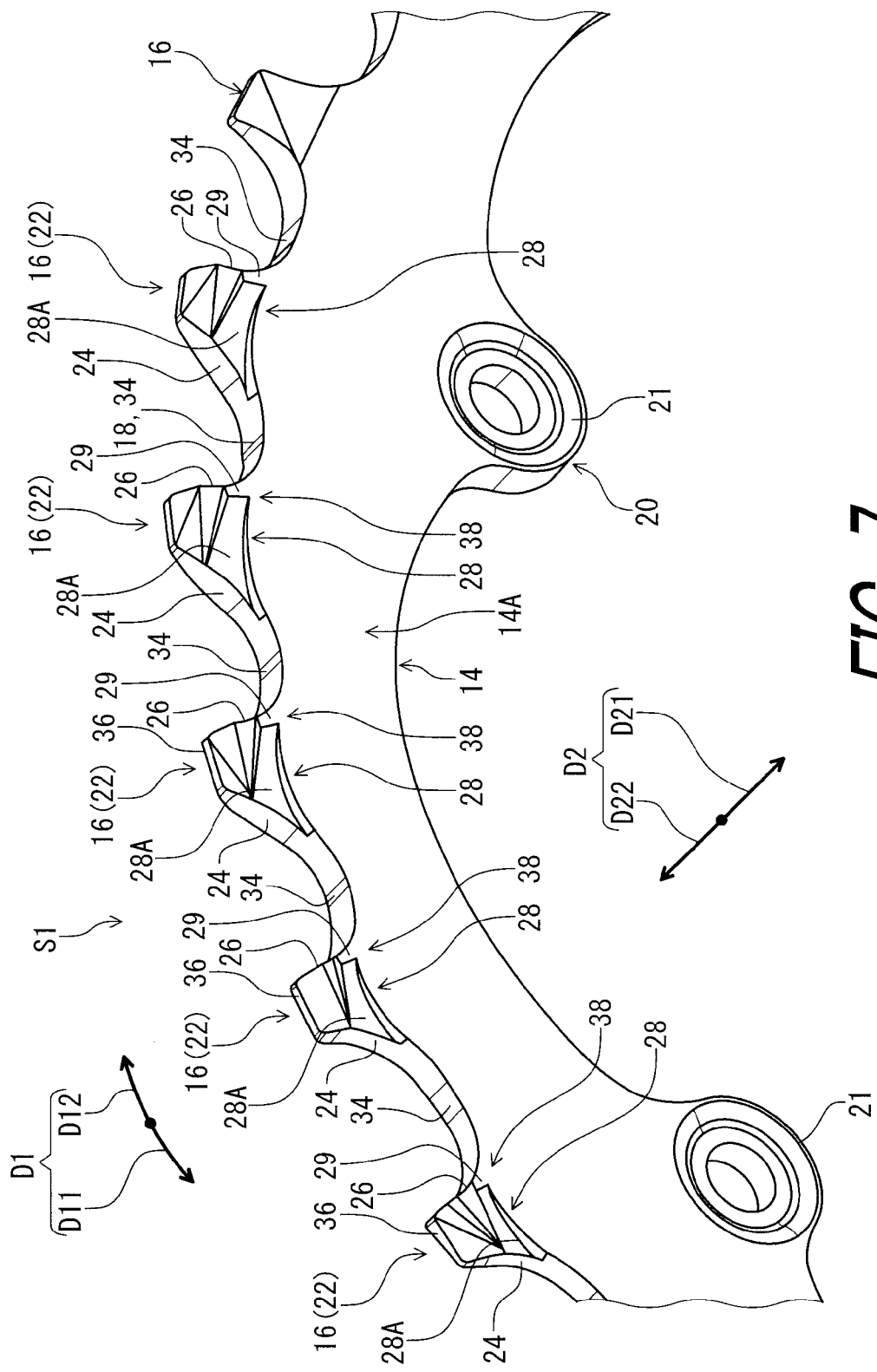
FIG. 7 is a partial perspective view of the first sprocket.

As seen in FIGS. 6 and 7, the first axial surface 28 includes an inclined surface 28A. In this embodiment, the inclined surface 28A has a curved shape. The inclined surface 28A has a concave shape. The inclined surface 28A has a concave curved shape. However, the shape of the inclined surface 28A is not limited to this embodiment. The inclined surface 28A can have another shape such as a flat shape or a convex curved shape.

As seen in FIG. 6, the inclined surface 28A is inclined relative to the axial center plane AP1 so that an axial width W1 of the at least one noise-reduction tooth 22 decreases from one of the upstream circumferential surface 26 and the downstream circumferential surface 24 to the other of the upstream circumferential surface 26 and the downstream circumferential surface 24. In this embodiment, the inclined surface 28A is inclined relative to the axial center plane AP1 so that the axial width W1 gradually decreases from one of the upstream circumferential surface 26 and the downstream circumferential surface 24 to the other of the upstream circumferential surface 26 and the downstream circumferential surface 24. The inclined surface 28A is engageable with an inner link plate C1 and an outer link plate (not shown) of the bicycle chain C.

As seen in FIG. 6, the inclined surface 28A is inclined relative to the axial center plane AP1 so that the axial width W1 of the at least one noise-reduction tooth 22 decreases from the upstream circumferential surface 26 to the downstream circumferential surface 24. The inclined surface 28A is inclined relative to the axial center plane AP1 so that the axial width W1 gradually decreases from the upstream circumferential surface 26 to the downstream circumferential surface 24. However, the inclined surface 28A can be inclined relative to the axial center plane AP1 so that the axial width W1 decreases from the downstream circumferential surface 24 to the upstream circumferential surface 26.

Figure 8:
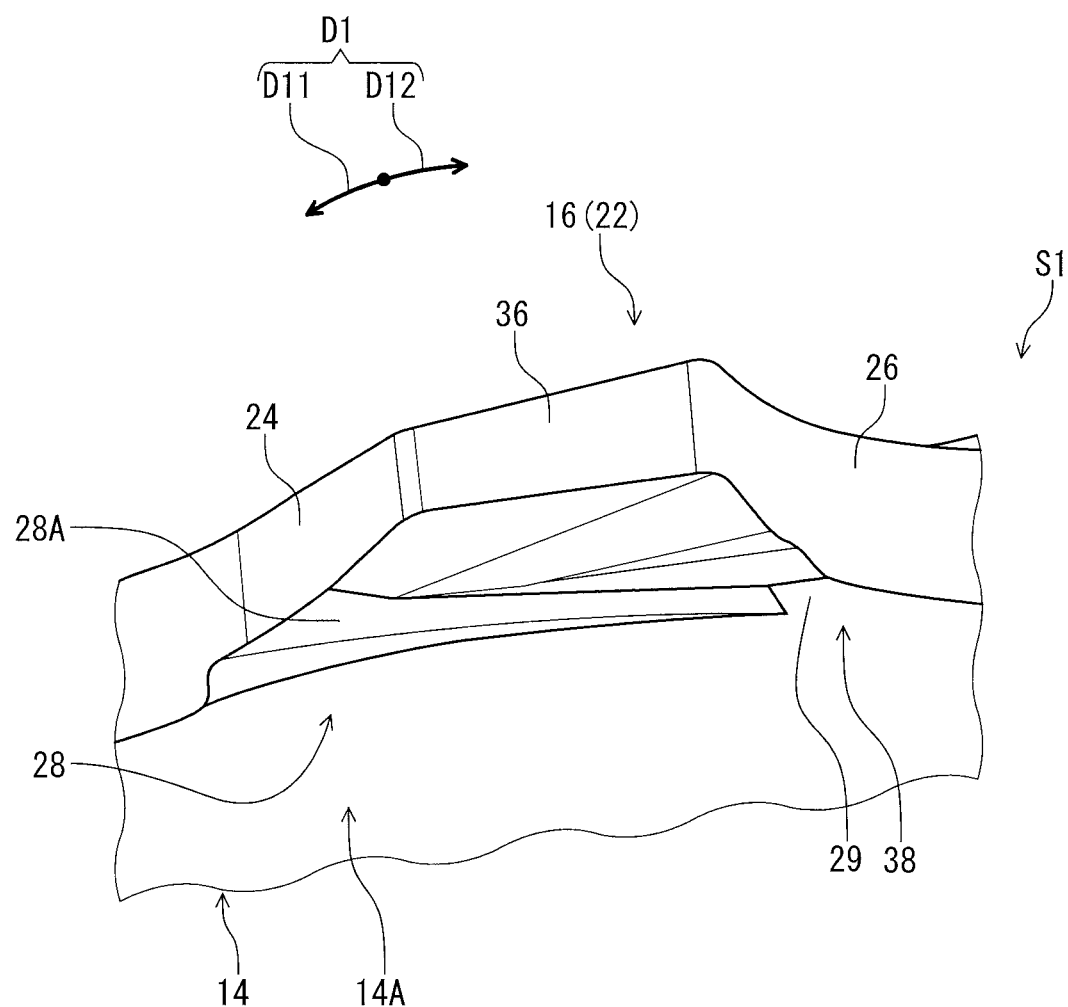
FIG. 8 is a partial enlarged perspective view of the first sprocket.

As seen in FIG. 8, the inclined surface 28A is continuously coupled to the downstream circumferential surface 24. The first axial surface 28 includes an intermediate surface 29 provided between the inclined surface 28A and the upstream circumferential surface 26. The inclined surface 28A is separately provided from the upstream circumferential surface 26. However, the inclined surface 28A can be separately provided from the downstream circumferential surface 24. The inclined surface 28A can be continuously coupled to the upstream circumferential surface 26.

As seen in FIG. 6, the intermediate surface 29 extends along the axial center plane AP1 to make the axial width W1 constant between the inclined surface 28A and the upstream circumferential surface 26. The intermediate surface 29 faces in the first axial direction D21 and is parallel to the axial center plane AP1. The intermediate surface 29 can extend along the axial center plane AP1 to make the axial width W1 substantially constant between the inclined surface 28A and the upstream circumferential surface 26. The inclined surface 28A is continuously coupled to the intermediate surface 29. The intermediate surface 29 is continuously coupled to the upstream circumferential surface 26. The intermediate surface 29 is provided at an axial position equal to an axial position of the first side surface 14A of the sprocket body 14 in the first axial direction D21. As seen in FIG. 7, the intermediate surface 29 is continuously coupled to the first side surface 14A of the sprocket body 14.

Figure 9:
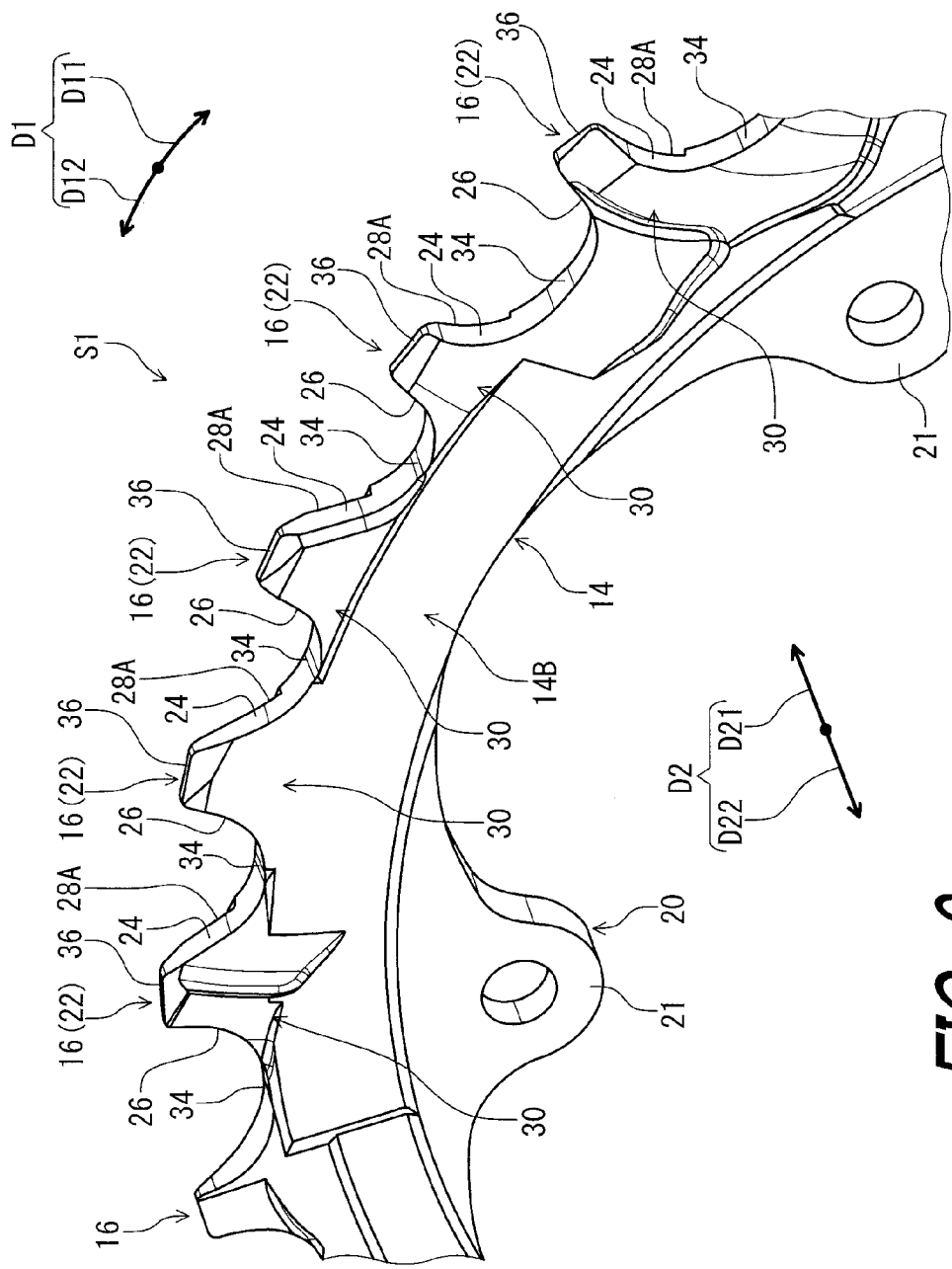
FIG. 9 is another partial perspective view of the first sprocket.

As seen in FIG. 9, the at least one noise-reduction tooth 22 comprises a second axial surface 30 provided between the downstream circumferential surface 24 and the upstream circumferential surface 26 to face in the axial direction D2. The second axial surface 30 faces in the second axial direction D22.

As seen in FIG. 6, the second axial surface 30 is opposite to the first axial surface 28 in the axial direction D2. The second axial surface 30 is provided on a reverse side of the first axial surface 28 in the axial direction D2. The axial width W1 of the at least one noise-reduction tooth 22 is defined between the inclined surface 28A of the first axial surface 28 and the second axial surface 30 in the axial direction D2.

A downstream axial width W11 is defined as the axial width W1 at a position closest to the downstream circumferential surface 24 in the inclined surface 28A. The downstream axial width W11 is defined between the inclined surface 28A of the first axial surface 28 and the second axial surface 30 in the axial direction D2. In this embodiment, the downstream axial width W11 is defined as the axial width W1 on the downstream circumferential surface 24 since the inclined surface 28A is continuously coupled to the downstream circumferential surface 24. However, the downstream axial width W11 can be defined as the axial width W1 at a position other than the downstream circumferential surface 24.

An upstream axial width W12 is defined as the axial width W1 at a position closest to the upstream circumferential surface 26 in the inclined surface 28A. The upstream axial width W12 is defined between the inclined surface 28A of the first axial surface 28 and the second axial surface 30 in the axial direction D2. However, the upstream axial width W12 can be defined as the axial width W1 on the upstream circumferential surface 26 in a case where the inclined surface 28A is continuously coupled to the upstream circumferential surface 26.

The inclined surface 28A includes a downstream edge 28A1 and an upstream edge 28A2. In this embodiment, the downstream axial width W11 is defined between the downstream edge 28A1 and the second axial surface 30 in the axial direction D2. The upstream axial width W12 is defined between the upstream edge 28A2 and the second axial surface 30 in the axial direction D2. The downstream edge 28A1 is closer to the axial center plane AP1 than the upstream edge 28A2.

The second side surface 14B can be a standard for the inclination of the inclined surface 28A. As seen in FIG. 6, the inclined surface 28A is inclined relative to the second side surface 14B so that an axial distance AD1 defined between the second side surface 14B and the inclined surface 28A in the axial direction D2 decreases from one of the upstream circumferential surface 26 and the downstream circumferential surface 24 to the other of the upstream circumferential surface 26 and the downstream circumferential surface 24. In this embodiment, the inclined surface 28A is inclined relative to the second side surface 14B so that an axial distance AD1 gradually decreases from one of the upstream circumferential surface 26 and the downstream circumferential surface 24 to the other of the upstream circumferential surface 26 and the downstream circumferential surface 24.

In this embodiment, the inclined surface 28A is inclined relative to the second side surface 14B so that the axial distance AD1 (e.g., gradually) decreases from the upstream circumferential surface 26 to the downstream circumferential surface 24. However, the inclined surface 28A can be inclined relative to the second side surface 14B so that the axial distance AD1 (e.g., gradually) decreases from the downstream circumferential surface 24 to the upstream circumferential surface 26.

As seen in FIG. 6, a downstream axial distance AD11 is defined as the axial distance AD1 at a position closest to the downstream circumferential surface 24 in the inclined surface 28A. The downstream axial distance AD11 is defined between the second side surface 14B and the inclined surface 28A in the axial direction D2. In this embodiment, the downstream axial distance AD11 is defined as the axial distance AD1 on the downstream circumferential surface 24 since the inclined surface 28A is continuously coupled to the downstream circumferential surface 24. However, the downstream axial distance AD11 can be defined as the axial distance AD1 at a position other than the downstream circumferential surface 24.

An upstream axial distance AD12 is defined as the axial distance AD1 at a position closest to the upstream circumferential surface 26 in the inclined surface 28A. The upstream axial distance AD12 is defined between the second side surface 14B and the inclined surface 28A in the axial direction D2. However, the upstream axial distance AD12 can be defined as the axial distance AD1 on the upstream circumferential surface 26 in a case where the inclined surface 28A is continuously coupled to the upstream circumferential surface 26.

In this embodiment, the downstream axial distance AD11 is defined between the downstream edge 28A1 and the second side surface 14B in the axial direction D2. The upstream axial distance AD12 is defined between the upstream edge 28A2 and the second side surface 14B in the axial direction D2.

Furthermore, the axial center plane AP1 can be a standard for the inclination of the inclined surface 28A. As seen in FIG. 6, the inclined surface 28A is inclined relative to the axial center plane AP1 so that an axial distance AD1A defined between the axial center plane AP1 and the inclined surface 28A in the axial direction D2 (e.g., gradually) decreases from one of the upstream circumferential surface 26 and the downstream circumferential surface 24 to the other of the upstream circumferential surface 26 and the downstream circumferential surface 24. In this embodiment, the inclined surface 28A is inclined relative to the axial center plane AP1 so that the axial distance AD1A (e.g., gradually) decreases from the upstream circumferential surface 26 to the downstream circumferential surface 24. However, the inclined surface 28A can be inclined relative to the axial center plane AP1 so that the axial distance AD1A decreases from the downstream circumferential surface 24 to the upstream circumferential surface 26.

As seen in FIG. 6, a downstream axial distance AD11A is defined as the axial distance AD1A at a position closest to the downstream circumferential surface 24 in the inclined surface 28A. The downstream axial distance AD11A is defined between the inclined surface 28A of the first axial surface 28 and the axial center plane AP1 in the axial direction D2. In this embodiment, the downstream axial distance AD11A is defined as the axial distance AD1A on the downstream circumferential surface 24 since the inclined surface 28A is continuously coupled to the downstream circumferential surface 24. However, the downstream axial distance AD11A can be defined as the axial distance AD1A at a position other than the downstream circumferential surface 24.

An upstream axial distance AD12A is defined as the axial distance AD1A at a position closest to the upstream circumferential surface 26 in the inclined surface 28A. The upstream axial distance AD12A is defined between the inclined surface 28A of the first axial surface 28 and the axial center plane AP1 in the axial direction D2. However, the upstream axial distance AD12A can be defined as the axial distance AD1A on the upstream circumferential surface 26 in a case where the inclined surface 28A is continuously coupled to the upstream circumferential surface 26.

In this embodiment, the downstream axial distance AD11A is defined between the downstream edge 28A1 and the axial center plane AP1 in the axial direction D2. The upstream axial distance AD12A is defined between the upstream edge 28A2 and the axial center plane AP1 in the axial direction D2.

As seen in FIG. 6, the inclined surface 28A of the first bicycle sprocket S1 has a first inclined angle AG1 with respect to a first axial center plane AP1 perpendicular to the rotational center axis A1. The first inclined angle AG1 is a smaller inclined angle defined between the first axial center plane AP1 and the inclined surface 28A. In this embodiment, the first inclined angle AG1 is defined between the first axial center plane AP1 and a first inclined reference line RL1 extending between the downstream edge 28A1 and the upstream edge 28A2.

As seen in FIG. 5, the bicycle sprocket S1 further comprises a plurality of tooth bottoms 34 respectively provided between adjacent two teeth of the plurality of chain-driving teeth 16 in the driving rotational direction D11. The plurality of tooth bottoms 34 define a root circle RC1. In this embodiment, the root circle RC1 coincides with the radially outer periphery 18 of the sprocket body 14.

As seen in FIG. 6, each of the plurality of tooth bottoms 34 includes a bottom axial width W13 defined in the axial direction D2. The downstream axial width W11 is smaller than the bottom axial width W13. The upstream axial width W12 is equal to the bottom axial width W13. However, the downstream axial width W11 can be equal to the bottom axial width W13, and the upstream axial width W12 can be smaller than the bottom axial width W13. In this embodiment, the bottom axial width W13 is defined between the first side surface 14A and the second side surface 14B in the axial direction D2.

As seen in FIG. 5, the at least one noise-reduction tooth 22 comprises a radially outermost end 36 farther from the root circle RC1 than the inclined surface 28A when viewed from the axial direction D2. The root circle RC1 is closer to the inclined surface 28A than the radially outermost end 36. In this embodiment, the radially outermost end 36 is radially farthest from the root circle RC1 in the noise-reduction tooth 22. However, the positional relationship among the root circle RC1, the radially outermost end 36, and the inclined surface 28A is not limited to this embodiment.

As seen in FIG. 6, the at least one noise-reduction tooth 22 has a chain engaging portion 38 engageable with the bicycle chain C. The inclined surface 28A is provided in the chain engaging portion 38. The chain engaging portion 38 is engageable with the inner link plate C1 of the bicycle chain C. The chain engaging portion 38 is provided on the first axial surface 28. The chain engaging portion 38 includes the intermediate surface 29 engageable with the inner link plate C1 of the bicycle chain C.

Figure 10:
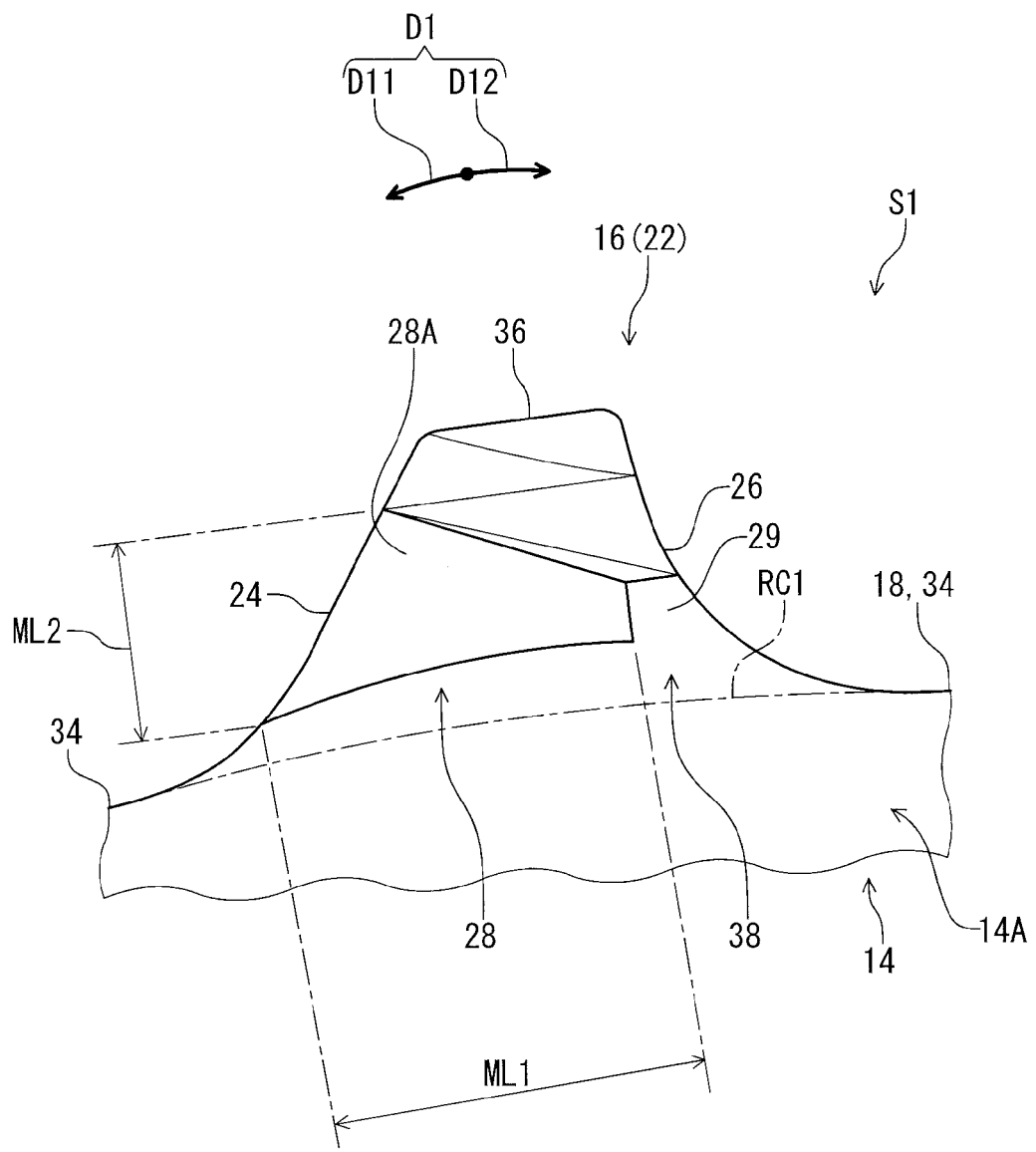
FIG. 10 is a partial enlarged side elevational view of the first sprocket.

As seen in FIG. 10, the inclined surface 28A has a maximum circumferential length ML1 and a maximum radial length ML2. The maximum circumferential length ML1 is defined in the driving rotational direction D11. The maximum radial length ML2 is defined in a radial direction perpendicular to the rotational center axis A1. The maximum circumferential length ML1 is longer than the maximum radial length ML2. However, the maximum circumferential length ML1 can be equal to or shorter than the maximum radial length ML2.

Figure 11:
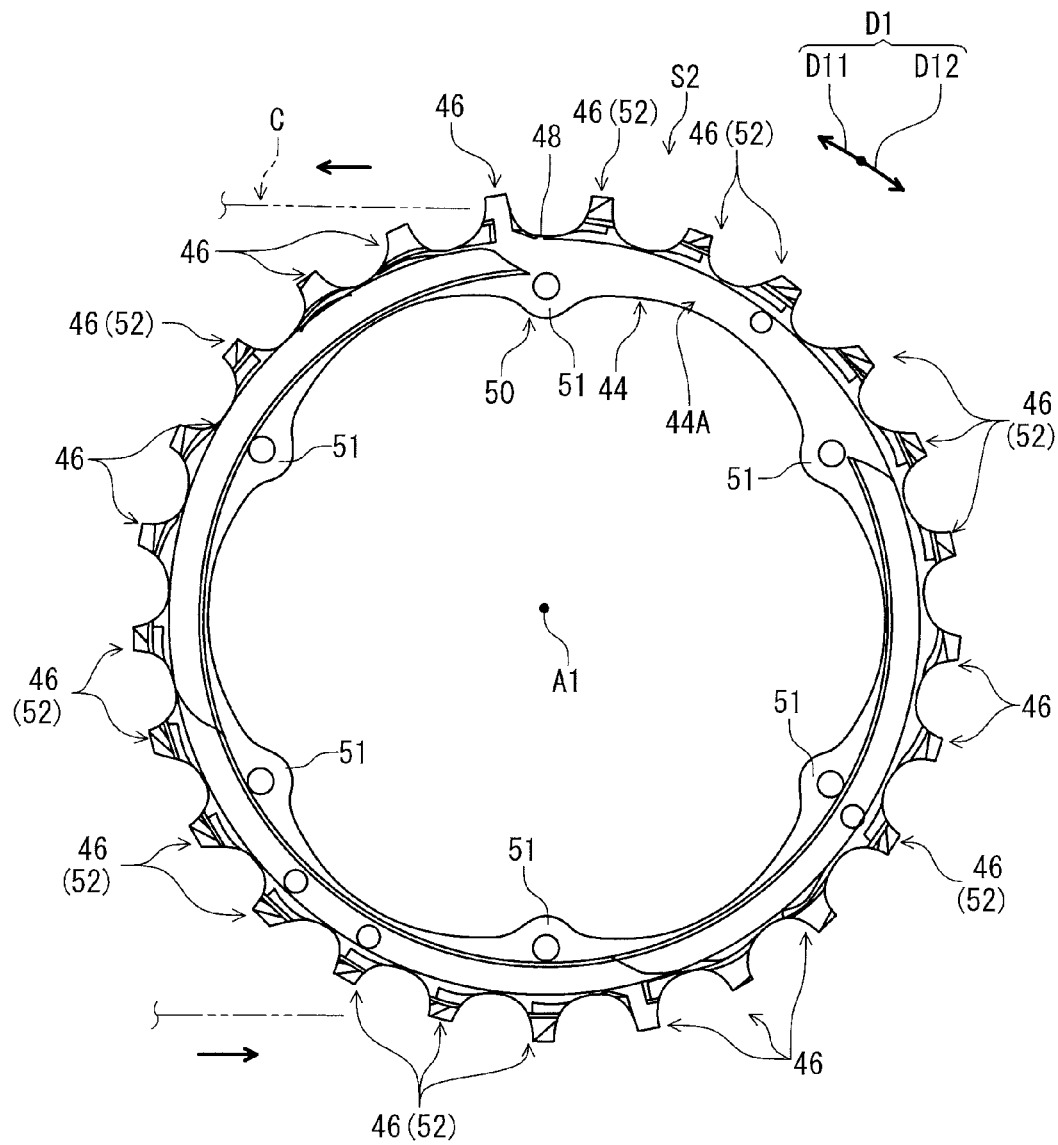
FIG. 11 is a side elevational view of a second sprocket of the bicycle rear sprocket assembly.
Figure 12:
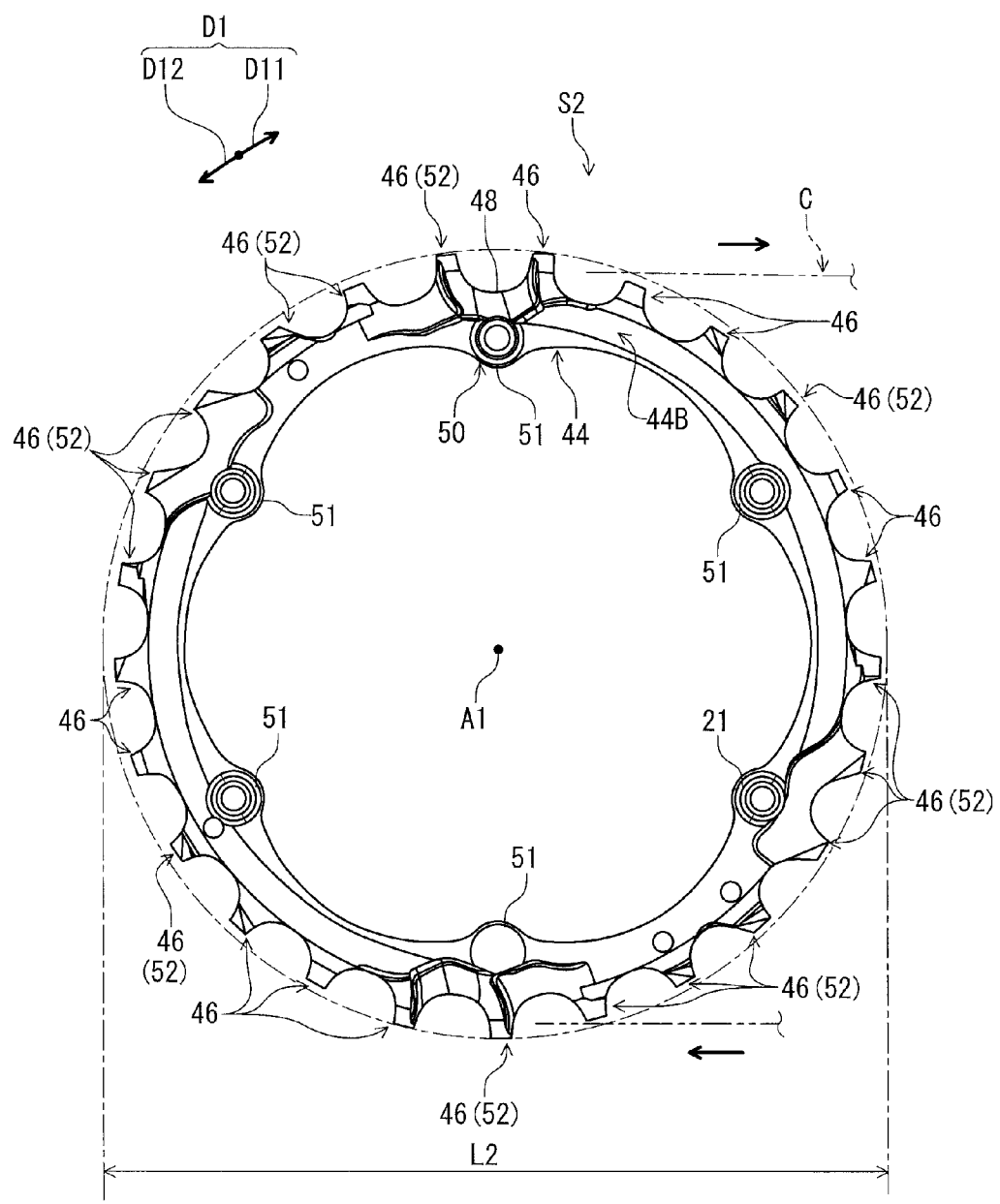
FIG. 12 is another side elevational view of the second sprocket.
Figure 13:
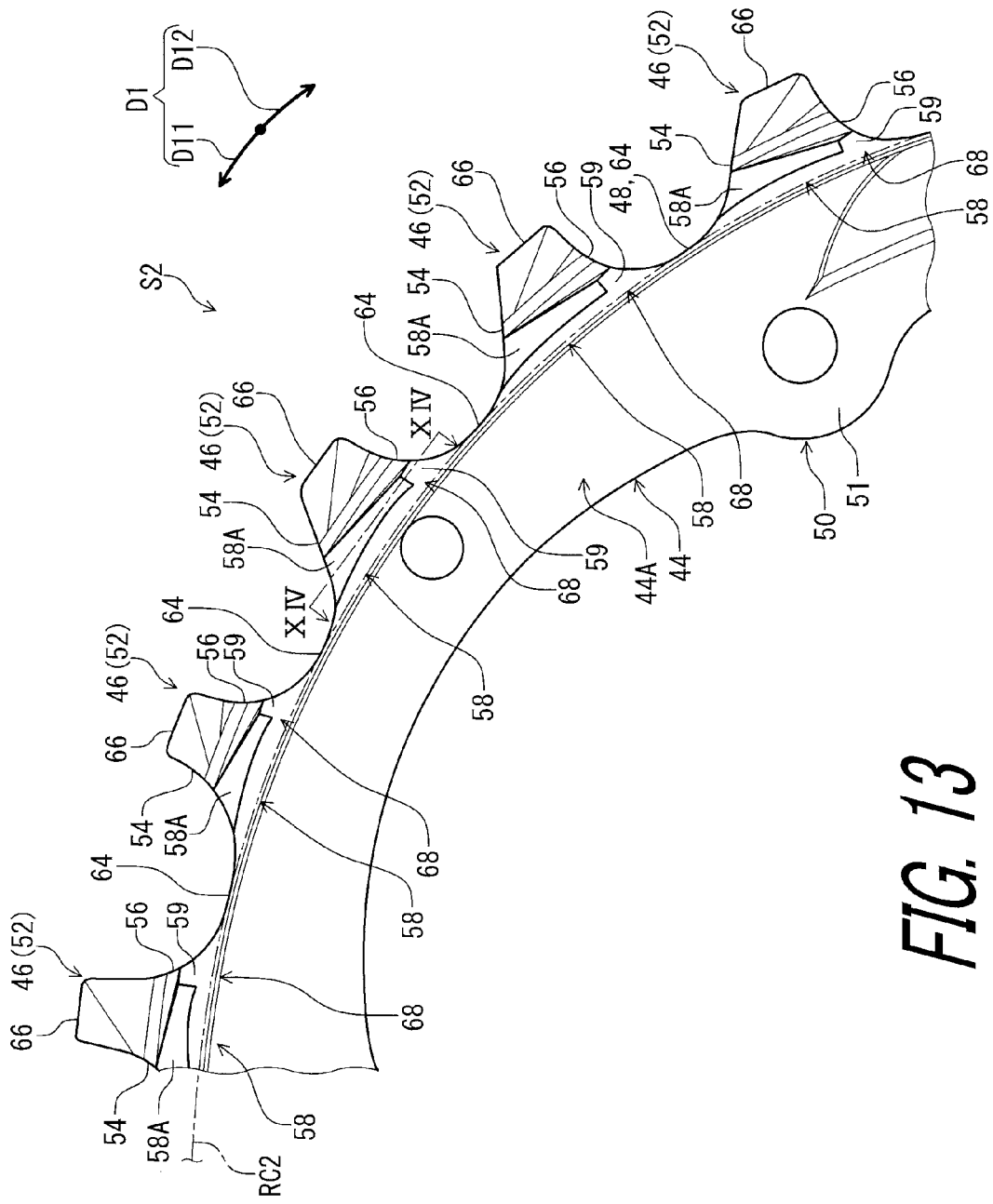
FIG. 13 is a partial side elevational view of the second sprocket.

As seen in FIGS. 11 to 13, the bicycle sprocket S2 comprises a sprocket body 44 and a plurality of chain-driving teeth 46. The sprocket body 44 includes a radially outer periphery 48, a first side surface 44A, and a second side surface 44B. The bicycle sprocket S2 further comprises a hub engagement part 50. The hub engagement part 50 includes securing portions 51. As seen in FIG. 12, the second bicycle sprocket S2 has a second diameter L2 defined by the plurality of chain-driving teeth 46 of the second bicycle sprocket S2. As seen in FIG. 2, the first diameter L1 is larger than the second diameter L2.

As seen in FIG. 13, the plurality of chain-driving teeth 46 includes at least one noise-reduction tooth 52. The at least one noise-reduction tooth 52 comprises a downstream circumferential surface 54, an upstream circumferential surface 56, and a first axial surface 58. The at least one noise-reduction tooth 52 further comprises a second axial surface 60 (FIG. 14) and a plurality of tooth bottoms 64. The plurality of tooth bottoms 64 define a root circle RC2. The at least one noise-reduction tooth 52 comprises a radially outer end 66.

Figure 14:
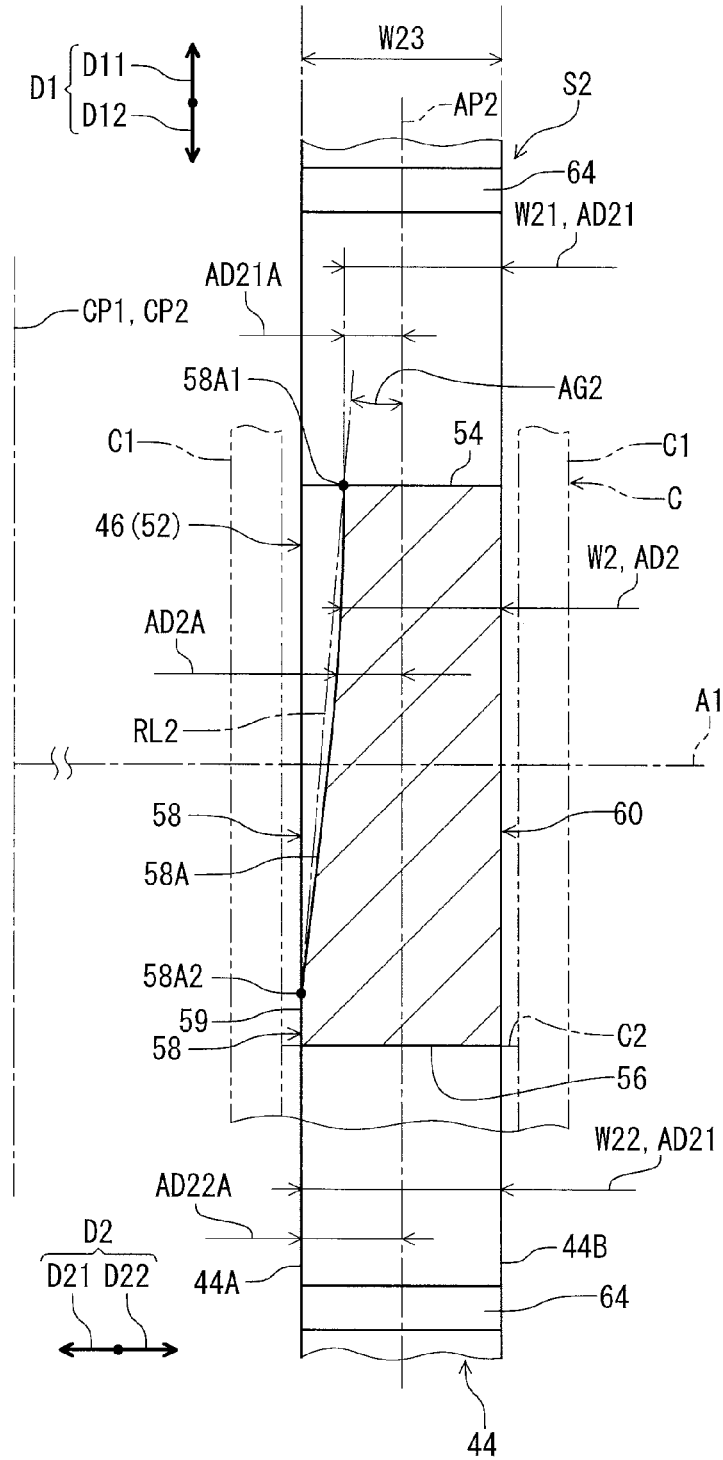
FIG. 14 is a cross-sectional view of the second sprocket taken along with line XIV-XIV of FIG. 13.

As seen in FIG. 14, the sprocket body 44 includes an axial center plane AP2. The axial center plane AP2 can also be referred to as a second axial center plane AP2. The first axial surface 58 includes an inclined surface 58A inclined relative to the axial center plane AP2 so that an axial width W2 of the at least one noise-reduction tooth 52 decreases from one of the upstream circumferential surface 56 and the downstream circumferential surface 54 to the other of the upstream circumferential surface 56 and the downstream circumferential surface 54.

The bicycle sprocket S2 has substantially the same structure as that of the bicycle sprocket S1. For example, the elements 44, 44A, 44B, 46, 48, 50, 51, 52, 54, 56, 58, 58A, 60, 64, 66, RC2, and AP2 have substantially the same structure as those of the elements 14, 14A, 14B, 16, 18, 20, 21, 22, 24, 26, 28, 28A, 30, 34, 36, RC1, and AP1 of the bicycle sprocket S1. Thus, they will not be described in detail here for the sake of brevity.

As seen in FIG. 14, the noise-reduction tooth 52 has a downstream axial width W21, an upstream axial width W22, a bottom axial width W23, an axial distance AD2 (AD2A), a downstream axial distance AD21 (AD21A), an upstream axial distance AD22 (AD22A), a downstream edge 58A1, an upstream edge 58A2, intermediate surface 59, and a chain engaging portion 68. The elements W21, W22, W23, AD2, AD21, AD22, AD2A, AD21A, AD22A, 58A1, 58A2, 59, and 68 have substantially the same structure as those of the elements W11, W12, W13, AD1, AD11, AD12, AD1A, AD11A, AD12A, 28A1, 28A2, 29, and 38 of the noise-reduction tooth 22. Thus, they will not be described in detail here for the sake of brevity.

As seen in FIG. 14, the inclined surface 58A of the second bicycle sprocket S2 has a second inclined angle AG2 with respect to the second axial center plane AP2 perpendicular to the rotational center axis A1. The second inclined angle AG2 is a smaller inclined angle defined between the second axial center plane AP2 and the inclined surface 58A. In this embodiment, the second inclined angle AG2 is defined between the second axial center plane AP2 and a second inclined reference line RL2 extending between the downstream edge 58A1 and the upstream edge 58A2.

Figure 15:
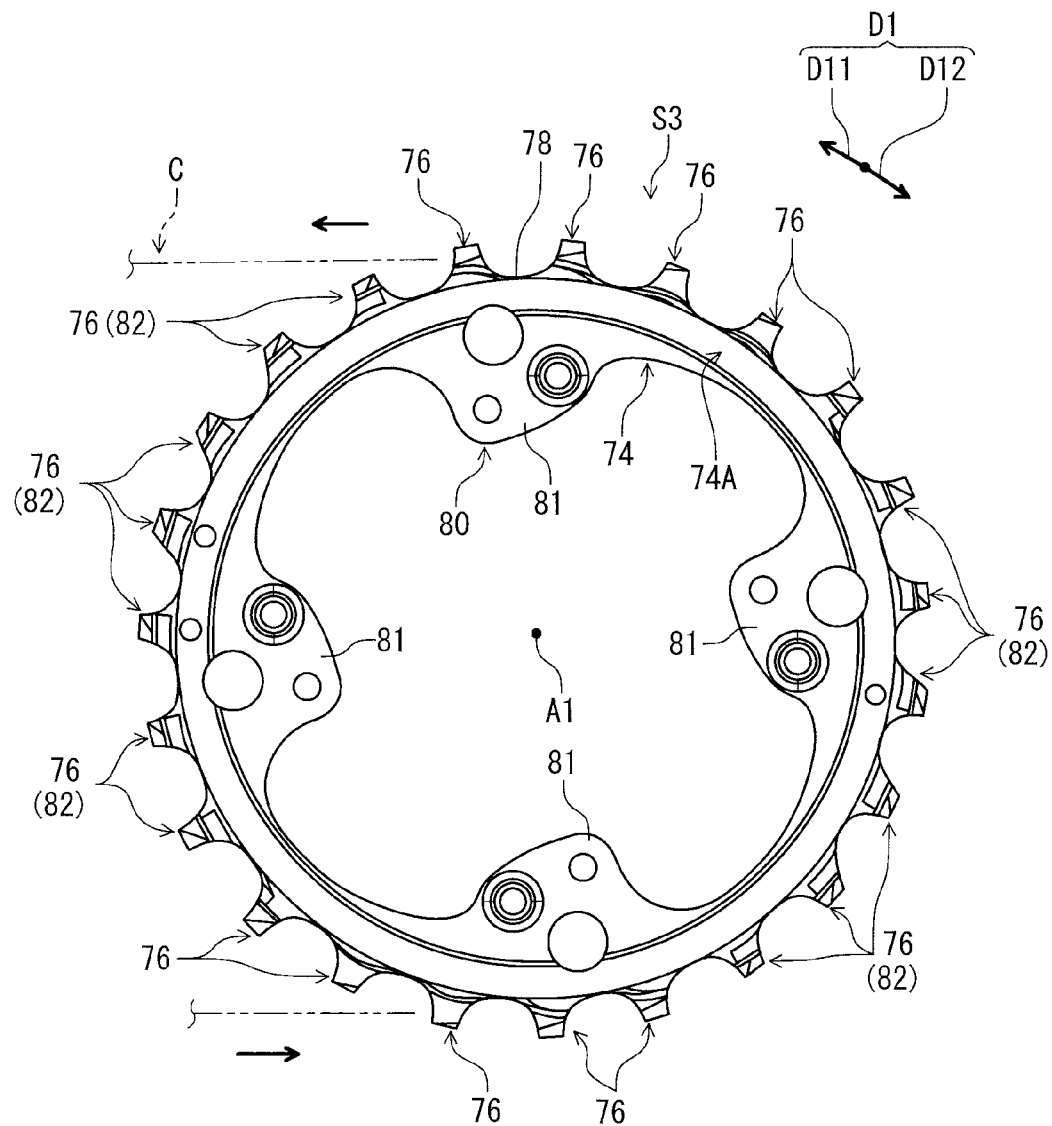
FIG. 15 is a side elevational view of a third sprocket of the bicycle rear sprocket assembly.
Figure 16:
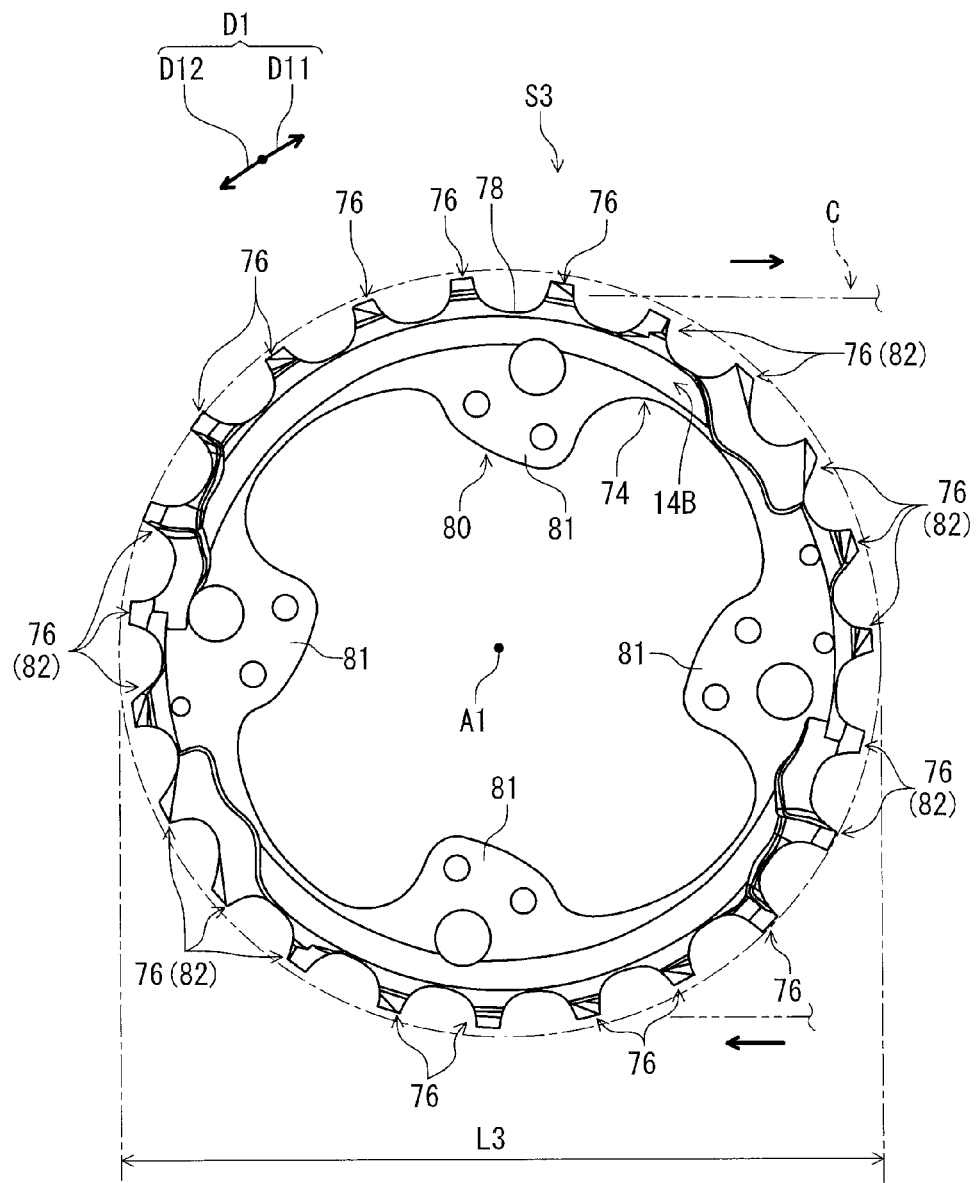
FIG. 16 is another side elevational view of the third sprocket.
Figure 17:
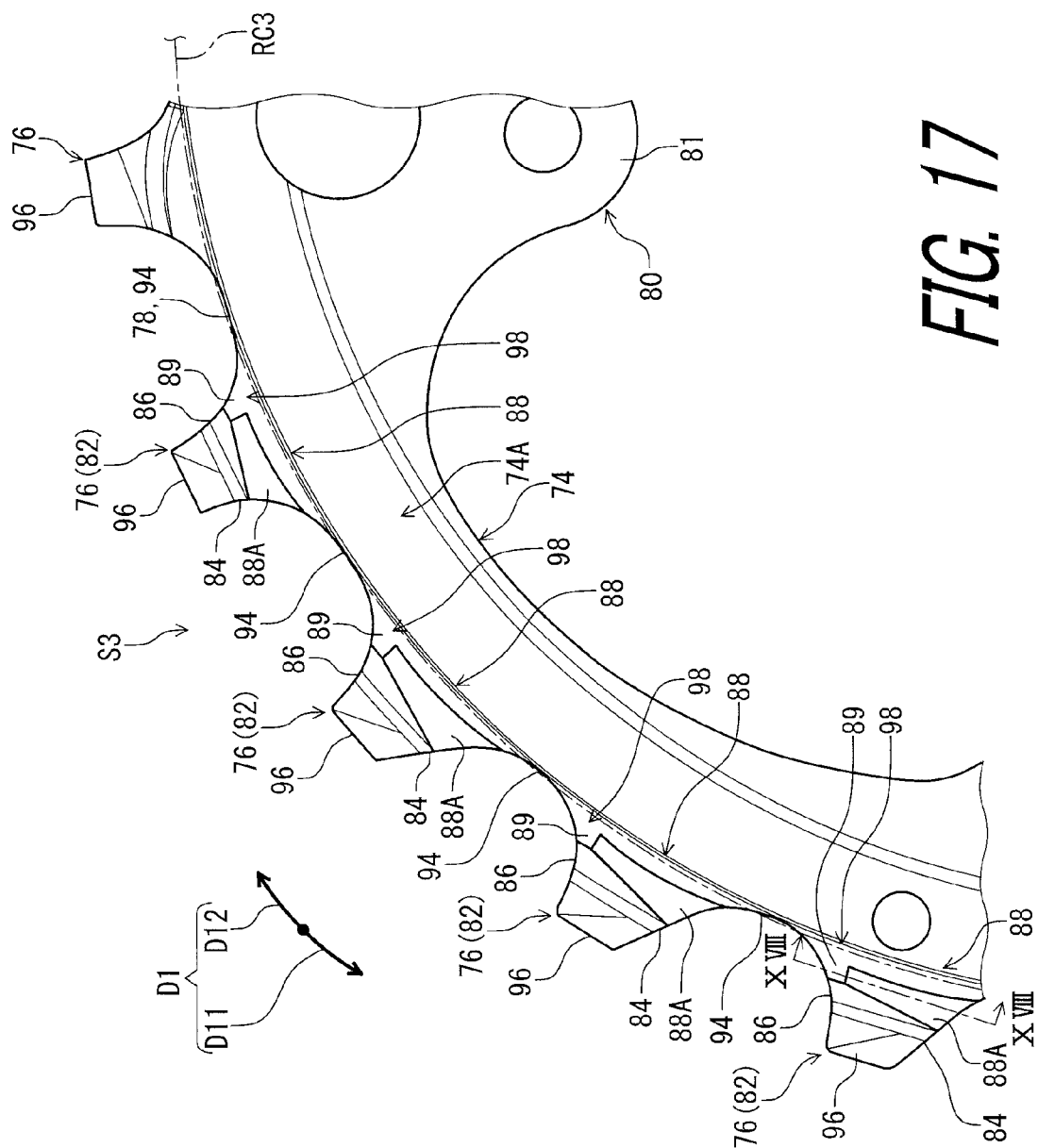
FIG. 17 is a partial side elevational view of the third sprocket.

As seen in FIGS. 15 to 17, the bicycle sprocket S3 comprises a sprocket body 74 and a plurality of chain-driving teeth 76. The sprocket body 74 includes a radially outer periphery 78, a first side surface 74A, and a second side surface 74B. The bicycle sprocket S3 further comprises a hub engagement part 80. The hub engagement part 80 includes securing portions 81. As seen in FIG. 16, the third bicycle sprocket S3 has a third diameter L3 defined by the plurality of chain-driving teeth 76 of the third bicycle sprocket. As seen in FIG. 2, the second diameter L2 is larger than the third diameter L3.

As seen in FIG. 17, the plurality of chain-driving teeth 76 includes at least one noise-reduction tooth 82. The at least one noise-reduction tooth 82 comprises a downstream circumferential surface 84, an upstream circumferential surface 86, and a first axial surface 88. The at least one noise-reduction tooth 82 further comprises a second axial surface 90 (FIG. 18) and a plurality of tooth bottoms 94. The plurality of tooth bottoms 94 define a root circle RC3. The at least one noise-reduction tooth 82 comprises a radially outer end 96.

Figure 18:
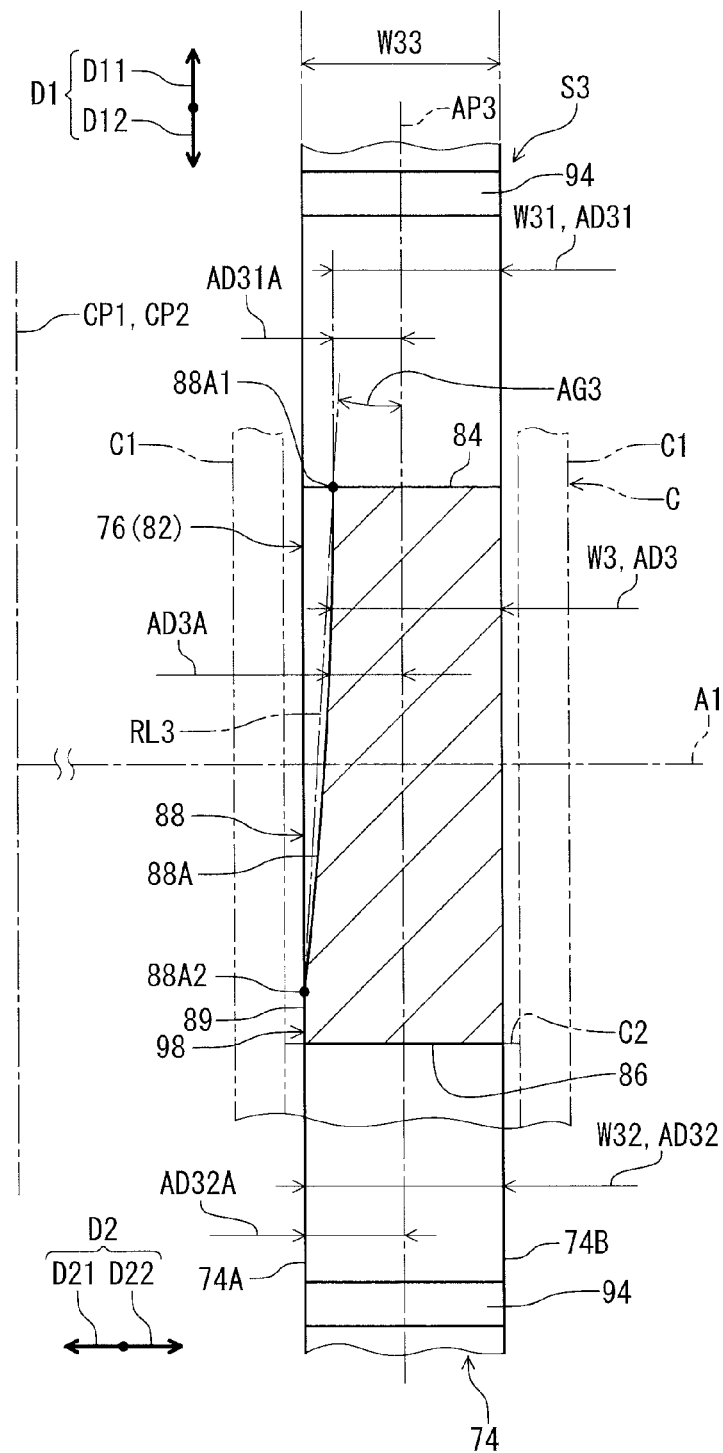
FIG. 18 is a cross-sectional view of the third sprocket taken along with line XVIII-XVIII of FIG. 17.

As seen in FIG. 18, the sprocket body 74 includes an axial center plane AP3. The axial center plane AP3 can also be referred to as a third axial center plane AP3. The first axial surface 88 includes an inclined surface 88A inclined relative to the axial center plane AP3 so that an axial width W3 of the at least one noise-reduction tooth 82 decreases from one of the upstream circumferential surface 86 and the downstream circumferential surface 84 to the other of the upstream circumferential surface 86 and the downstream circumferential surface 84.

The bicycle sprocket S3 has substantially the same structure as that of the bicycle sprocket S1. For example, the elements 74, 74A, 74B, 76, 78, 80, 81, 82, 84, 86, 88, 88A, 90, 94, 96, RC3, and AP3 have substantially the same structure as those of the elements 14, 14A, 14B, 16, 18, 20, 21, 22, 24, 26, 28, 28A, 30, 34, 36, RC1, and AP1 of the bicycle sprocket S1. Thus, they will not be described in detail here for the sake of brevity.

As seen in FIG. 18, the noise-reduction tooth 82 has a downstream axial width W31, an upstream axial width W32, a bottom axial width W33, an axial distance AD3 (AD3A), a downstream axial distance AD31 (AD31A), an upstream axial distance AD32 (AD32A), a downstream edge 88A1, an upstream edge 88A2, intermediate surface 89, a radially outer end 96, and a chain engaging portion 98. The elements W31, W32, W33, AD3, AD31, AD32, AD3A, AD31A, AD32A, 88A1, 88A2, 89, and 98 have substantially the same structure as those of the elements W11, W12, W13, AD1, AD11, AD12, AD1A, AD11A, AD12A, 28A1, 28A2, 29, and 38 of the noise-reduction tooth 22. Thus, they will not be described in detail here for the sake of brevity.

As seen in FIG. 18, the inclined surface 88A of the third bicycle sprocket S3 has a third inclined angle AG3 with respect to the third axial center plane AP3 perpendicular to the rotational center axis A1. The third inclined angle AG3 is a smaller inclined angle defined between the third axial center plane AP3 and the inclined surface 88A. In this embodiment, the third inclined angle AG3 is defined between the third axial center plane AP3 and a third inclined reference line RL3 extending between the downstream edge 88A1 and the upstream edge 88A2.

As seen in FIGS. 6, 14, and 18, the first inclined angle AG1 is larger than the second inclined angle AG2. The second inclined angle AG2 is larger than the third inclined angle AG3. However, the first inclined angle AG1 can be equal to or smaller than the second inclined angle AG2. The second inclined angle AG2 can be equal to or smaller than the third inclined angle AG3.

Figure 19:
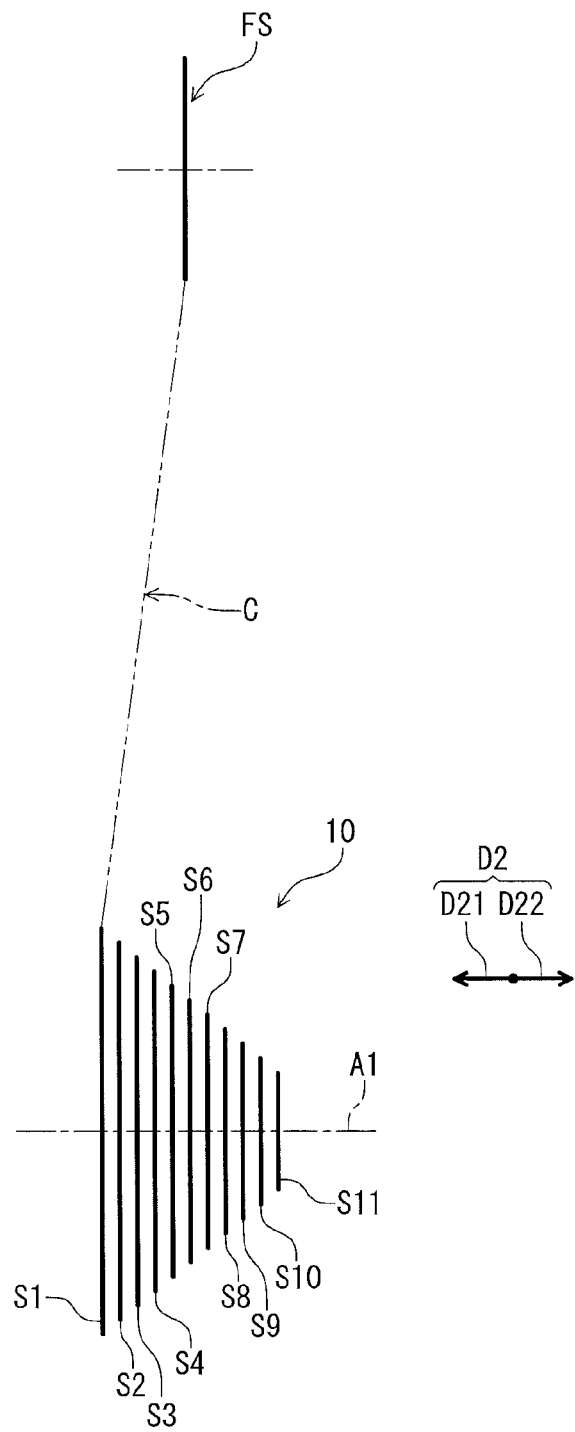
FIG. 19 is a schematic diagram showing a positional relationship among the bicycle rear sprocket assembly, a front sprocket, and a bicycle chain.

As seen in FIG. 19, the bicycle chain C extends between a front sprocket FS and the bicycle rear sprocket assembly 10 in a state where the bicycle chain C is engaged with the front sprocket FS and the bicycle rear sprocket assembly 10. The bicycle sprocket S1 is offset from the front sprocket FS in the axial direction D2. Thus, the bicycle chain C is inclined relative to the bicycle sprocket S1 when viewed from a radial direction perpendicular to the rotational center axis A1 in a state where the bicycle chain C is engaged with the bicycle sprocket S1.

Figure 20:
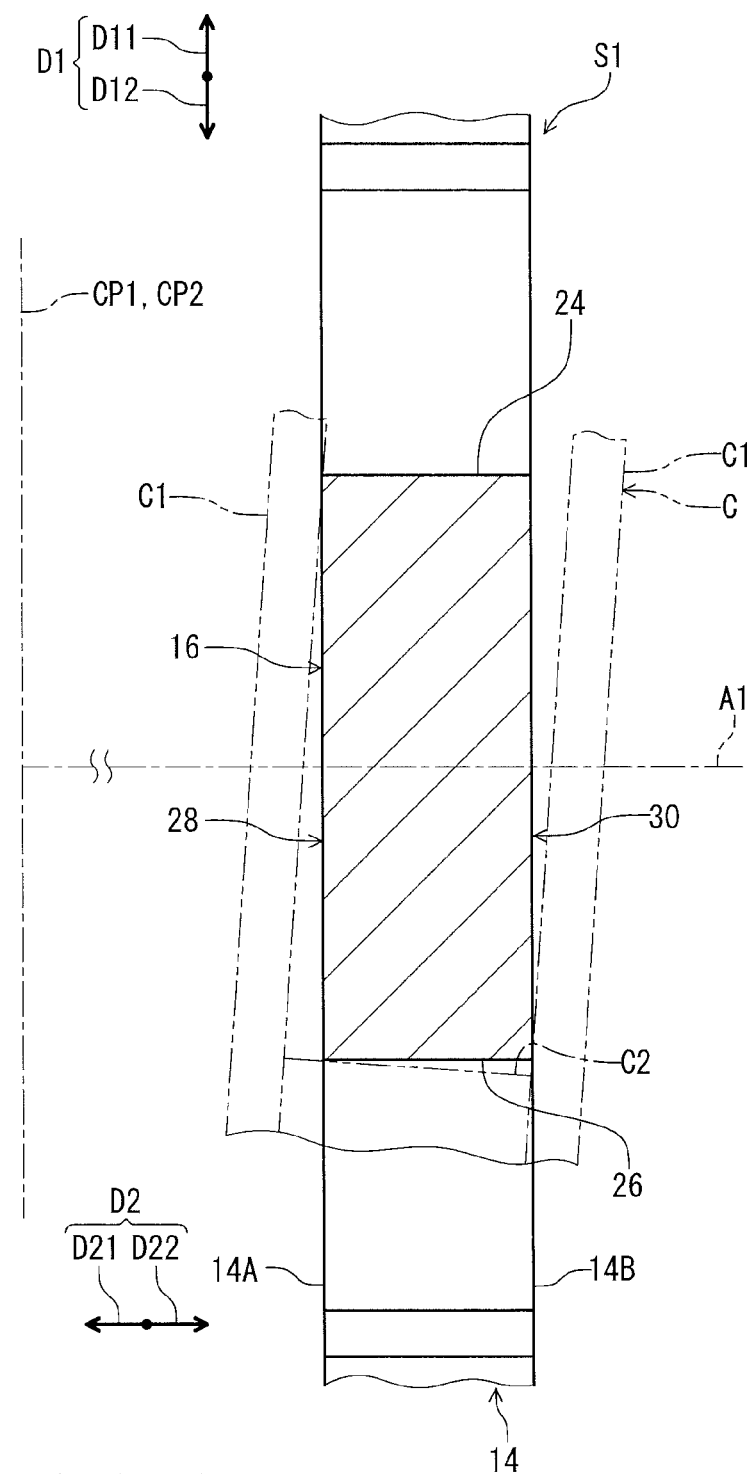
FIG. 20 is a cross-sectional view of the first sprocket with an inclined surface omitted (comparative example).

As seen in FIG. 20, in a case where the bicycle sprocket S1 does not comprises the noise-reduction tooth 22, the inclination of the bicycle chain C relative to the bicycle sprocket S1 increases noise when the chain-driving tooth 16 comes into engagement with and/or is disengaged from the inner link plates C1 of the bicycle chain C.

Figure 21:
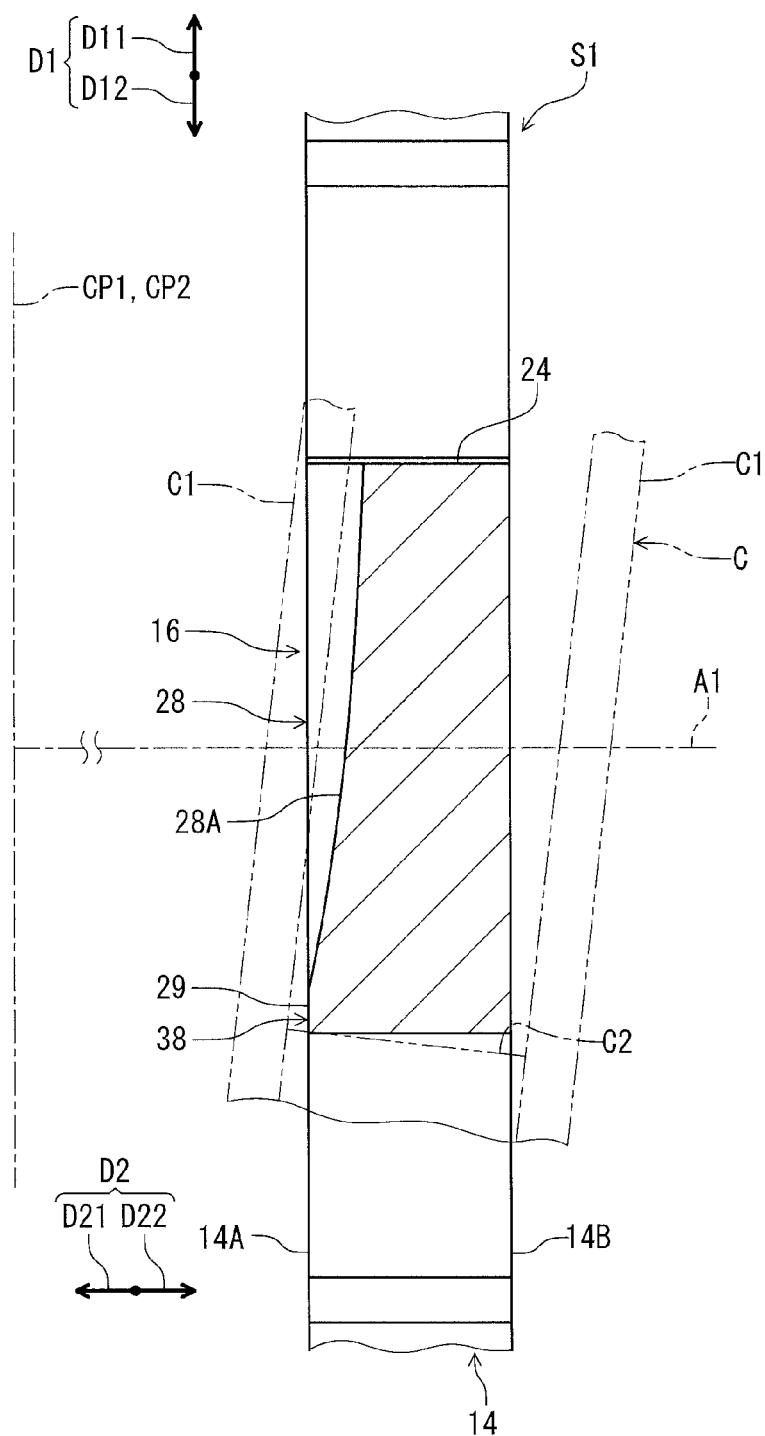
FIG. 21 is a cross-sectional view of the first sprocket with the bicycle chain inclined relative to the first sprocket.

As seen in FIG. 21, however, the inclined surface 28A of the first axial surface 28 can follow the inclination of the bicycle chain C. This can smoothen engagement and/or disengagement between the noise-reduction tooth 22 and the inner link plates C1 of the bicycle chain C even if the bicycle chain C is inclined relative to the bicycle sprocket S1. Accordingly, with the bicycle sprocket S1, it is possible to reduce noise caused by contact between the plurality of chain-driving teeth 16 and the bicycle chain C even if the bicycle chain C is inclined relative to the bicycle sprocket S1 when viewed from the radial direction perpendicular to the rotational center axis A1. With the bicycle sprockets S2 and S3, it is possible to obtain substantially the same effect as that of the bicycle sprocket S1.

Figure 22:
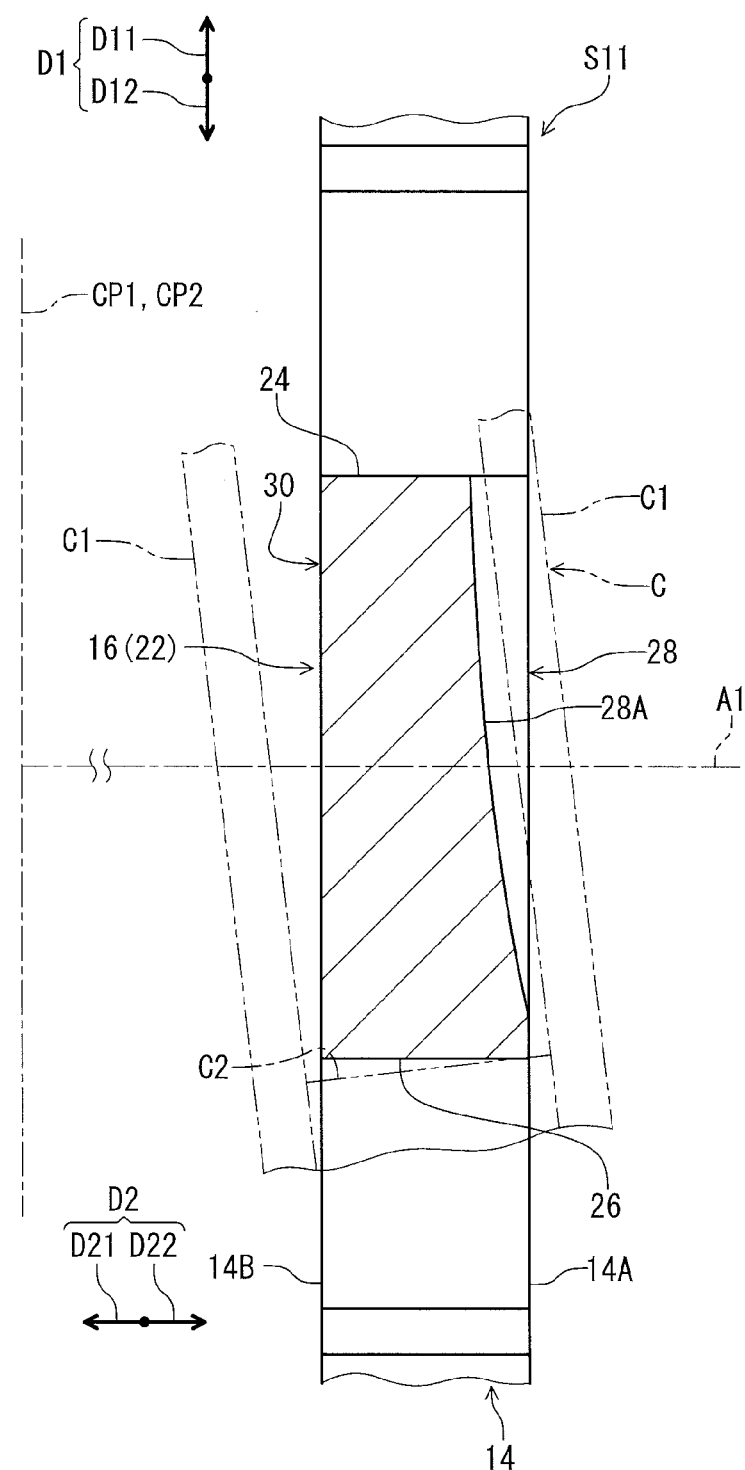
FIG. 22 is a cross-sectional view of another sprocket with the inclined surface.

The structure of the bicycle sprockets S1 to S3 can be applied to the front sprocket FS instead of or in addition to the bicycle rear sprocket assembly 10. Furthermore, the structure of the bicycle sprockets S1 to S3 can be applied to at least one of the bicycle sprockets S4 to S11. As seen in FIG. 22, in a case where the bicycle sprocket S11 comprises the noise-reduction tooth 22, the first axial surface 28 faces toward an opposite side of the bicycle center plane CP1 relative to the bicycle sprocket S11.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
   a sprocket body including
      a radially outer periphery provided about a rotational center axis of the bicycle sprocket, and
      an axial center plane perpendicular to the rotational center axis; and
   a plurality of chain-driving teeth provided on the radially outer periphery to engage with a bicycle chain, the plurality of chain-driving teeth including at least one noise-reduction tooth, the at least one noise-reduction tooth comprising:
      a downstream circumferential surface facing in a driving rotational direction in which the bicycle sprocket is rotated about the rotational center axis during pedaling;
      an upstream circumferential surface facing in a reversing rotational direction opposite to the driving rotational direction; and
      a first axial surface provided between the downstream circumferential surface and the upstream circumferential surface to face in an axial direction parallel to the rotational center axis, the first axial surface including an inclined surface inclined relative to the axial center plane so that an axial width of the at least one noise-reduction tooth decreases from one of the upstream circumferential surface and the downstream circumferential surface to the other of the upstream circumferential surface and the downstream circumferential surface, wherein
   the inclined surface has
      a maximum circumferential length defined in the driving rotational direction, and
      a maximum radial length defined in a radial direction perpendicular to the rotational center axis, and
   the maximum circumferential length is longer than the maximum radial length.

2. The bicycle sprocket according to claim 1, wherein
   the at least one noise reduction tooth has a chain engaging portion engageable with the bicycle chain, and
   the inclined surface is provided in the chain engaging portion.

3. The bicycle sprocket according to claim 1, wherein
   the at least one noise-reduction tooth comprises a second axial surface provided between the downstream circumferential surface and the upstream circumferential surface to face in the axial direction,
   the second axial surface is opposite to the first axial surface in the axial direction, and
   the axial width of the at least one noise-reduction tooth is defined between the inclined surface of the first axial surface and the second axial surface in the axial direction.

4. The bicycle sprocket according to claim 3, further comprising
   a plurality of tooth bottoms respectively provided between adjacent two teeth of the plurality of chain-driving teeth in the driving rotational direction, wherein
   each of the plurality of tooth bottoms includes a bottom axial width defined in the axial direction,
   a downstream axial width is defined as the axial width at a position closest to the downstream circumferential surface in the inclined surface and is defined between the inclined surface of the first axial surface and the second axial surface in the axial direction, and
   the downstream axial width is smaller than the bottom axial width.

5. The bicycle sprocket according to claim 1, further comprising
   a plurality of tooth bottoms respectively provided between adjacent two teeth of the plurality of chain-driving teeth in the driving rotational direction, wherein
   the plurality of tooth bottoms define a root circle, and
   the at least one noise-reduction tooth comprises a radially outermost end farther from the root circle than the inclined surface when viewed from the axial direction.

6. The bicycle sprocket according to claim 5, wherein
   the root circle is closer to the inclined surface than the radially outermost end.

7. The bicycle sprocket according to claim 1, wherein
   the inclined surface is continuously coupled to the downstream circumferential surface.

8. The bicycle sprocket according to claim 1, wherein
the first axial surface includes an intermediate surface provided between the inclined surface and the upstream circumferential surface, and
the intermediate surface extends along the axial center plane to make the axial width constant between the inclined surface and the upstream circumferential surface.

9. The bicycle sprocket according to claim 1, further comprising
a hub engagement part coupled to the sprocket body to engage with a bicycle hub assembly.

10. The bicycle sprocket according to claim 1, wherein
the inclined surface is inclined relative to the axial center plane so that the axial width of the at least one noise-reduction tooth decreases from the upstream circumferential surface to the downstream circumferential surface.

11. A bicycle rear sprocket assembly comprising:
at least three bicycle sprockets according to claim 10; and
at least six additional bicycle sprockets, the at least three bicycle sprockets being positioned closer to an axial hub-center plane of a bicycle rear hub assembly than the at least six additional bicycle sprockets in a state where the bicycle rear sprocket assembly is mounted to the bicycle rear hub assembly.

12. The bicycle rear sprocket assembly according to claim 11, wherein
the at least three bicycle sprockets includes
a first bicycle sprocket having a first diameter defined by the plurality of chain-driving teeth of the first bicycle sprocket,
a second bicycle sprocket having a second diameter defined by the plurality of chain-driving teeth of the second bicycle sprocket, and
a third bicycle sprocket having a third diameter defined by the plurality of chain-driving teeth of the third bicycle sprocket,
the first diameter is larger than the second diameter, and
the second diameter is larger than the third diameter.

13. The bicycle sprocket according to claim 1, wherein
the maximum radial length is measured from a top radial edge of the inclined surface to a bottom radial edge of the inclined surface and the maximum circumferential length is measured from a downstream circumferential edge of the inclined surface to an upstream circumferential edge of the inclined surface.

14. The bicycle sprocket according to claim 1, wherein
the inclined surface is disposed on a portion of the at least one noise-reduction tooth that protrudes in the axial direction as compared to a radially outer end portion of the at least one noise-reduction tooth.

15. A bicycle rear sprocket assembly comprising:
at least three bicycle sprockets comprising:
a sprocket body including
a radially outer periphery provided about a rotational center axis of the bicycle sprocket, and
an axial center plane perpendicular to the rotational center axis; and
a plurality of chain-driving teeth provided on the radially outer periphery to engage with a bicycle chain, the plurality of chain-driving teeth including at least one noise-reduction tooth, the at least one noise-reduction tooth comprising:
a downstream circumferential surface facing in a driving rotational direction in which the bicycle sprocket is rotated about the rotational center axis during pedaling;
an upstream circumferential surface facing in a reversing rotational direction opposite to the driving rotational direction; and
a first axial surface provided between the downstream circumferential surface and the upstream circumferential surface to face in an axial direction parallel to the rotational center axis, the first axial surface including an inclined surface inclined relative to the axial center plane so that an axial width of the at least one noise-reduction tooth decreases from one of the upstream circumferential surface and the downstream circumferential surface to the other of the upstream circumferential surface and the downstream circumferential surface; and
at least six additional bicycle sprockets, the at least three bicycle sprockets being positioned closer to an axial hub-center plane of a bicycle rear hub assembly than the at least six additional bicycle sprockets in a state where the bicycle rear sprocket assembly is mounted to the bicycle rear hub assembly, wherein
the inclined surface is inclined relative to the axial center plane so that the axial width of the at least one noise-reduction tooth decreases from the upstream circumferential surface to the downstream circumferential surface,
the at least three bicycle sprockets includes
a first bicycle sprocket having a first diameter defined by the plurality of chain-driving teeth of the first bicycle sprocket,
a second bicycle sprocket having a second diameter defined by the plurality of chain-driving teeth of the second bicycle sprocket, and
a third bicycle sprocket having a third diameter defined by the plurality of chain-driving teeth of the third bicycle sprocket,
the first diameter is larger than the second diameter,
the second diameter is larger than the third diameter,
the inclined surface of the first bicycle sprocket has a first inclined angle with respect to a first axial center plane perpendicular to the rotational center axis,
the inclined surface of the second bicycle sprocket has a second inclined angle with respect to a second axial center plane perpendicular to the rotational center axis,
the inclined surface of the third bicycle sprocket has a third inclined angle with respect to a third axial center plane perpendicular to the rotational center axis,
the first inclined angle is larger than the second inclined angle, and
the second inclined angle is larger than the third inclined angle.

16. A bicycle sprocket comprising:
a sprocket body including
a radially outer periphery provided about a rotational center axis of the bicycle sprocket,
a first side surface facing in an axial direction parallel to the rotational center axis, and
a second side surface facing in the axial direction and provided on a reverse side of the first side surface in the axial direction; and
a plurality of chain-driving teeth provided on the radially outer periphery to engage with a bicycle chain, the plurality of chain-driving teeth including at least one noise-reduction tooth, the at least one noise-reduction tooth comprising:

a downstream circumferential surface facing in a driving rotational direction in which the bicycle sprocket is rotated about the rotational center axis during pedaling;

an upstream circumferential surface facing in a reversing rotational direction opposite to the driving rotational direction; and a first axial surface provided between the downstream circumferential surface and the upstream circumferential surface to face in the axial direction, the first side surface being closer to the first axial surface than the second side surface in the axial direction, the first axial surface including an inclined surface inclined relative to the second side surface so that an axial distance defined between the second side surface and the inclined surface in the axial direction decreases from one of the upstream circumferential surface and the downstream circumferential surface to the other of the upstream circumferential surface and the downstream circumferential surface, wherein the inclined surface has
a maximum circumferential length defined in the driving rotational direction, and
a maximum radial length defined in a radial direction perpendicular to the rotational center axis, and the maximum circumferential length is longer than the maximum radial length.

17. The bicycle sprocket according to claim 16, wherein the maximum radial length is measured from a top radial edge of the inclined surface to a bottom radial edge of the inclined surface and the maximum circumferential length is measured from a downstream circumferential edge of the inclined surface to an upstream circumferential edge of the inclined surface.

18. The bicycle sprocket according to claim 16, wherein the inclined surface is disposed on a portion of the at least one noise-reduction tooth that protrudes in the axial direction as compared to a radially outer end portion of the at least one noise-reduction tooth.

* * * * *